United States Patent
Kwon

(10) Patent No.: US 8,564,579 B2
(45) Date of Patent: Oct. 22, 2013

(54) AMBIENT LIGHT SENSING CIRCUIT AND FLAT PANEL DISPLAY INCLUDING AMBIENT LIGHT SENSING CIRCUIT

(75) Inventor: Ohkyong Kwon, Seoul (KR)

(73) Assignees: Samsung Display Co., Ltd., Yongin-City, Gyeonggi-Do (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 1048 days.

(21) Appl. No.: 12/003,439

(22) Filed: Dec. 26, 2007

(65) Prior Publication Data

US 2008/0158211 A1 Jul. 3, 2008

(30) Foreign Application Priority Data

Dec. 27, 2006 (KR) .................. 10-2006-0135377
Dec. 27, 2006 (KR) .................. 10-2006-0135378
Dec. 27, 2006 (KR) .................. 10-2006-0135379
Dec. 27, 2006 (KR) .................. 10-2006-0135380

(51) Int. Cl.
*G06F 3/038* (2006.01)
*G09G 5/00* (2006.01)

(52) U.S. Cl.
USPC ............. 345/207; 345/102; 345/77; 348/602; 348/603

(58) Field of Classification Search
USPC ............. 345/207, 102, 77; 250/214 R, 214 P, 250/214 D, 214 A, 214 LA, 214 LS; 315/156–159; 348/602–603
See application file for complete search history.

(56) References Cited

U.S. PATENT DOCUMENTS

| 4,924,081 | A | * | 5/1990 | Arima et al. ............... 250/214 R |
| 5,705,807 | A | * | 1/1998 | Throngnumchai et al. .................. 250/214 P |
| 6,909,462 | B1 | | 6/2005 | Shinotsuka et al. |
| 6,958,775 | B1 | | 10/2005 | Shinotsuka et al. |
| 6,975,008 | B2 | | 12/2005 | Cok |
| 7,095,392 | B2 | | 8/2006 | Lin |
| 2002/0024378 | A1 | | 2/2002 | Forbes et al. |
| 2002/0101166 | A1 | * | 8/2002 | Weindorf et al. ............... 315/82 |
| 2005/0200291 | A1 | | 9/2005 | Naugler, Jr. et al. |

(Continued)

FOREIGN PATENT DOCUMENTS

| CN | 1 713 254 A | 12/2005 |
| CN | 1 875 250 A | 12/2006 |

(Continued)

OTHER PUBLICATIONS

Japanese Office Action in JP 2007-180243, dated Jan. 4, 2011 (Kwon).

(Continued)

*Primary Examiner* — Jonathan Horner
(74) *Attorney, Agent, or Firm* — Lee & Morse, P.C.

(57) ABSTRACT

An ambient light sensing circuit includes a photodiode that flows a current in proportion to ambient light, a first storage capacitor that is electrically coupled with the photodiode and is discharged after being charged with a voltage of a first power supply, a second storage capacitor that is electrically coupled with the first storage capacitor and provides a coupling voltage, and a transistor that outputs a current from the first power supply corresponding to the coupling voltage of the first storage capacitor and the second storage capacitor after being electrically coupled with the second storage capacitor.

20 Claims, 11 Drawing Sheets

(56) References Cited

U.S. PATENT DOCUMENTS

| | | |
|---|---|---|
| 2005/0258341 A1 | 11/2005 | Nishikawa et al. |
| 2006/0001624 A1 | 1/2006 | Lee |
| 2006/0108511 A1 | 5/2006 | Cok et al. |
| 2006/0158542 A1 | 7/2006 | Mizuno et al. |
| 2006/0227082 A1 | 10/2006 | Ogata et al. |
| 2006/0273998 A1 | 12/2006 | Young |
| 2007/0035489 A1* | 2/2007 | Lee ............................. 345/77 |
| 2009/0015166 A1 | 1/2009 | Kwon |

FOREIGN PATENT DOCUMENTS

| | | |
|---|---|---|
| DE | 100 65 887 A1 | 7/2001 |
| DE | 10065887 A1 | 7/2001 |
| EP | 1 164 641 A | 12/2001 |
| EP | 1335430 A1 | 8/2003 |
| EP | 1 589 518 A | 10/2005 |
| EP | 1732315 A1 | 12/2006 |
| JP | 08-101659 | 4/1996 |
| JP | 11-264761 A | 9/1999 |
| JP | 2001-109434 | 4/2001 |
| JP | 2002-300475 A | 10/2002 |
| JP | 2004-233569 | 8/2004 |
| JP | 2004-273440 | 9/2004 |
| JP | 2008-165172 A | 7/2008 |
| KR | 10-2000-0067627 A | 11/2000 |
| KR | 10-2003-0023972 A | 3/2003 |
| KR | 10-2005-0119559 A | 12/2005 |
| KR | 10-2006-0107345 A | 10/2006 |
| KR | 10-2006-0107525 A | 10/2006 |
| WO | WO 99/12148 A | 3/1999 |
| WO | WO 2004/023444 A1 | 3/2004 |
| WO | WO 2005/015530 A1 | 2/2005 |
| WO | WO 2006/123293 A | 11/2006 |

OTHER PUBLICATIONS

Taiwanese Office action dated Jun. 21, 2012, (Kwon).
Extended European Search Report dated Jul. 11, 2012. (Kwon).

* cited by examiner

AMBIENT LIGHT SENSING CIRCUIT AND FLAT PANEL DISPLAY INCLUDING AMBIENT LIGHT SENSING CIRCUIT

CROSS REFERENCE TO RELATED APPLICATION

Cross reference is made to concurrently filed U.S. patent application Ser. No. 12/003,440 and titled "Ambient Light Sensing Circuit and Flat Panel Display Including Ambient Light Sensing Circuit."

BACKGROUND OF THE INVENTION

1. Field of the Invention

Embodiments relate to an ambient light sensing circuit and a flat panel display including such an ambient light sensing circuit.

2. Description of the Related Art

Flat panel displays include organic light emitting displays, liquid crystal displays, plasma displays and electric field emitting displays, etc. Such flat panel displays are relatively thinner, lighter and consume less power than conventional cathode ray tube (CRT) displays. Of the flat panel displays, organic light emitting displays and liquid crystal displays are generally more widely employed as displays for portable electronic devices because they are relatively easier to reduce in size and may be used with a battery for a relatively long time.

In general, screen brightness of flat panel displays, e.g., organic light emitting displays or liquid crystal displays, may be adjusted manually with user manipulation. However, they are generally designed to display a screen with constant brightness irrespective of ambient brightness. For example, typically, flat panel displays are designed to have optimum screen brightness in a room where ambient brightness is not high. Hence, screen brightness may be relatively too high in a dark place and may be relatively too low under sunlight. Therefore, there may be problems associated with visibility.

Further, because conventional flat panel displays may be designed to have constant screen brightness, when using such a flat panel display for a long time in a place where ambient brightness is relatively low, if screen brightness is not manually adjusted, screen brightness may be unnecessarily high and, as a result, power consumption may also be unnecessarily high.

Moreover, in conventional flat panel displays, a sensor, a processing circuit, etc., are formed on a different substrate from a main substrate on which a flat display panel is formed. Thus, if an ambient light sensing circuit for sensing ambient brightness is electrically coupled to the main substrate, size, thickness and amount of power consumption of the flat panel display may be increased.

SUMMARY OF THE INVENTION

Embodiments are therefore directed to ambient light sensing circuits and flat panel displays including such ambient light sensing circuits that substantially overcome one or more of the problems due to the limitations and disadvantages of the related art.

It is therefore a feature of an embodiment of the invention to provide an ambient light sensing circuit that can accurately sense ambient brightness.

It is therefore a separate feature of an embodiment of the invention to provide a flat panel display that may automatically adjust screen brightness in accordance with ambient brightness.

It is therefore a separate feature of an embodiment of the invention to provide an ambient light sensing circuit and a flat panel display including the same that may realize an ambient light sensing circuit, a signal processing circuit, etc., by a low temperature polycrystalline silicon thin film transistor on a substrate on which a pixel circuit is formed.

At least one of the above and other features and advantages of the invention may be realized by providing an ambient light sensing circuit, including a photodiode that flows a current in proportion to ambient light, a first storage capacitor that is electrically coupled with the photodiode and is discharged after being charged with a voltage of a first power supply, a second storage capacitor that is electrically coupled with the first storage capacitor and provides a coupling voltage, and a transistor that outputs a current from the first power supply corresponding to the coupling voltage of the first storage capacitor and the second storage capacitor after being electrically coupled with the second storage capacitor.

The first storage capacitor may be electrically coupled with a third storage capacitor that increases a reverse bias potential of the photodiode. The photodiode, the first storage capacitor and the second storage capacitor may be initialized by being electrically coupled between the first power supply and a second power supply, the first storage capacitor may be electrically coupled with the photodiode and is discharged in accordance with ambient light incident on the photodiode, the second storage capacitor and the transistor may be electrically coupled between the first power supply such that the second storage capacitor stores a threshold voltage of the transistor, and the first storage capacitor and the second storage capacitor are electrically coupled with each other and the transistor outputs a current correspondingly to the coupling voltage of the first storage capacitor and the second storage capacitor.

The photodiode may be one of a PIN diode, a PN diode and a photocoupler. The photodiode may be electrically coupled with a first switch that couples the photodiode with the first power supply and/or the first storage capacitor. The first storage capacitor may electrically coupled with a second switch that electrically couples the first storage capacitor with the first power supply and/or the second storage capacitor. A first electrode of the transistor may be electrically coupled with a third switch that supplies the first power supply, a fourth switch may be electrically coupled between a second electrode and a control electrode of the transistor, the second electrode of the transistor may be electrically coupled with a fifth switch that supplies a second power supply, and an output terminal for outputting a current, wherein the output terminal being between the first electrode of the transistor and the third switch.

When the fifth switch is turned on, a voltage charged in an output load coupled through the output terminal is discharged to the second power supply through the transistor and the fifth switch. A first electrode of the third storage capacitor may be electrically coupled with the first storage capacitor through a sixth switch and with the first power supply through a seventh switch, and a second electrode of the third storage capacitor is electrically coupled with a second power supply.

The first power supply may be electrically coupled with an eighth switch for supplying the first power supply to the photodiode, the first storage capacitor and the second storage capacitor. A first electrode of the transistor may be electrically coupled with an ambient light control processor.

The ambient light control processor may include an analog-digital converter that is electrically coupled with the first electrode of the transistor, a first memory that is electrically coupled with the analog-digital converter and stores a digital value in accordance with present ambient light, a controller that is electrically coupled with the first memory and calculates and outputs brightness of the present ambient light, and a second memory that is electrically coupled with the controller and has predetermined digital values corresponding to ambient light of various brightness levels stored therein.

The analog-digital converter may include an output load that is electrically coupled with the first electrode of the transistor, a fourth storage capacitor that is electrically coupled between the output load and a second power supply.

At least one of the above and other features and advantages of the invention may be separately realized by providing a flat panel display including an ambient light sensing circuit including a photodiode that flows a current in proportion to ambient light, a first storage capacitor that is electrically coupled with the photodiode and is discharged after being charged with a voltage of a first power supply, a second storage capacitor that is electrically coupled with the first storage capacitor and provides a coupling voltage, and a transistor that flows a current from the first power supply corresponding to the coupling voltage of the first storage capacitor and the second storage capacitor after being electrically coupled with the second storage capacitor, an ambient light control processor that calculates present ambient light based on the current from the transistor and outputs a digital value corresponding to the present ambient light, and a timing controller that outputs a control signal corresponding to the present ambient light based on the digital value output by the ambient light control processor.

The timing controller may include a lookup table including predetermined digital values corresponding to ambient light of various brightness levels stored therein, and a brightness selector that compares the digital value output by the ambient light control processor with the predetermined digital values stored in the lookup table, selects a control signal corresponding to the present ambient light, and outputs the control signal corresponding to the present ambient light.

The flat panel display may include a data driver that outputs a data signal corresponding to the present ambient light based on the control signal output by the timing controller, and an organic light emitting display panel that emits light based on the data signal output by the data driver.

The data signal output by the data driver is a data voltage that is proportional to the present ambient light sensed by the ambient light sensing circuit. The flat panel display may include a light emission control driver that outputs a light emission control signal corresponding to the present ambient light based on the control signal output by the timing controller, and an organic light emitting display panel that emits light based on the light emission control signal output by the light emission control driver.

The light emission control signal output by the light emission control driver controls an on-time of a light emission control signal supplied to the organic light emitting display panel, and the on-time of the light emission control signal may be proportional to the present ambient light sensed by the ambient light sensing circuit.

The flat panel display may include a power supply controller that outputs a power supply voltage corresponding to the present ambient light based on the control signal output by the timing controller, and an organic light emitting display panel that emits light based on the power supply voltage output by the power supply controller.

The flat panel display may include a buffer that boosts and outputs a power supply voltage corresponding to the present ambient light based on the control signal output by the timing controller, a backlight that is lighted by a voltage supplied from the buffer, and a liquid crystal display panel that displays an image using light emitted from the backlight.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1A:
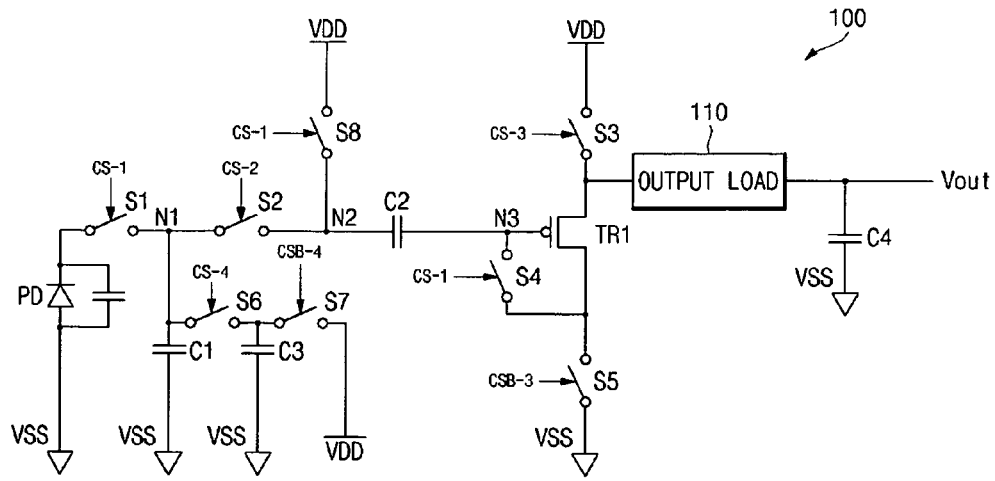
FIGS. 1A and 1B illustrate circuit diagrams of exemplary ambient light sensing circuits according to aspects of the present invention.

Korean Patent Application Nos. 10-2006-0135377, 10-2006-0135378, 10-2006-0135379 and 10-2006-0135380 filed on Dec. 27, 2006, in the Korean Intellectual Property Office, and entitled: "Ambient Light Sensing Circuit and Flat Panel Display Having the Same," are incorporated by reference herein in their entirety.

Embodiments of the invention will now be described more fully hereinafter with reference to the accompanying drawings, in which exemplary embodiments of the invention are illustrated. Aspects of the invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions may be exaggerated for clarity of illustration.

It will be understood that when an element is referred to as being "coupled" to another element, it can be directly coupled to the other element or intervening elements may be present. In contrast, when an element is referred to as being "directly coupled," there are no intervening elements present. Like reference numerals refer to like elements throughout the specification.

Figure 1B:
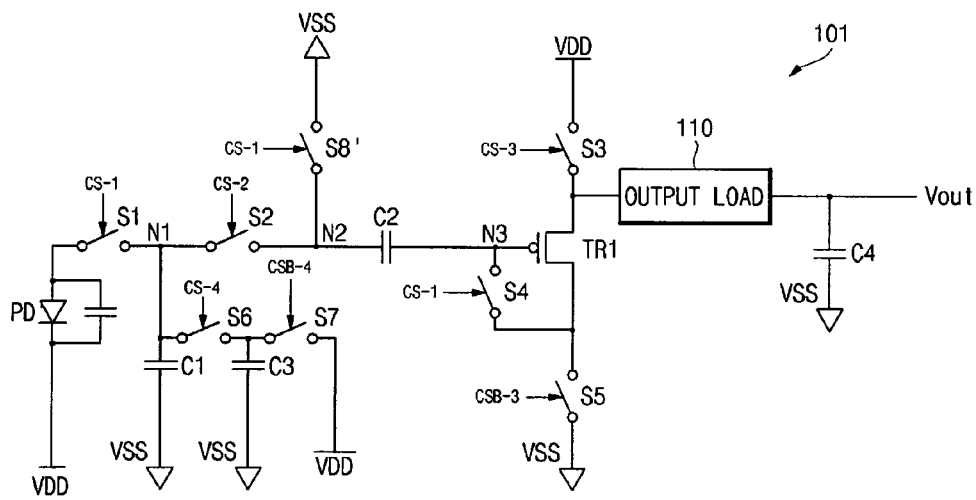

FIGS. 1A and 1B illustrate circuit diagrams of exemplary ambient light sensing circuits 100, 101 according to aspects of the present invention.

As shown in FIG. 1A, the ambient light sensing circuit 100 may include a photodiode PD, a transistor TR1, a first storage capacitor C1, a second storage capacitor C2, a third storage capacitor C3, a first switch S1, a second switch S2, a third switch S3, a fourth switch S4, a fifth switch S5, a sixth switch S6, a seventh switch S7, and an eighth switch S8.

The photodiode PD may enable a constant current to flow in accordance with ambient brightness. A cathode of the photodiode PD may be electrically coupled with a first power supply VDD, and an anode thereof may be electrically coupled with a second power supply VSS. The photodiode PD may be, e.g., a positive-intrinsic-negative PIN diode, a pn junction PN diode, a photocoupler, etc., that is electrically coupled between the first power supply VDD and the second power supply VSS in the reverse direction, but is not limited thereto. The first power supply VDD may have a higher electric potential than the second power supply VSS.

The photodiode PD may be electrically coupled with the first switch S1, which may electrically couple the photodiode PD with the first power supply VDD or the first storage capacitor C1. A first electrode of the first switch S1 may be electrically connected with the cathode of the photodiode PD. A second electrode of the first switch S1 may be electrically coupled with a first node N1, which may also be electrically coupled to a first electrode of the first storage capacitor C1. A first control signal CS-1 may be applied to a control electrode of the first switch S1.

The first electrode of the first storage capacitor C1 may be electrically coupled with the first power supply VDD via the first node N1, the second switch S2, a second node N2 and the eighth switch S8. A second electrode of the first storage capacitor C1 may be electrically coupled with the second power supply VSS. The first storage capacitor C1 may be charged with a voltage of the first power supply VDD before being electrically coupled with the photodiode PD, and then, discharged to a predetermined voltage.

A first electrode of the second switch S2 may be electrically coupled with the first power supply VDD via, e.g., the second node N2 and the eighth switch S8, and a second electrode of the second switch S2 may be electrically coupled to the first node N1. A second control signal CS-2 may be applied to a control electrode of the second switch S2 to control a state thereof.

A control electrode of the transistor TR1 may be electrically coupled with the second storage capacitor C2 via a third node N3, a first electrode of the transistor TR1 may be electrically coupled with a second electrode of the third switch S3, and a second electrode of the transistor TR1 may be electrically coupled with a second electrode of the fourth switch S4 and a first electrode of the fifth switch S5. The transistor TR1 may output a constant current in accordance with a coupling voltage of the first storage capacitor C1 and the second storage capacitor C2. A coupling voltage of the first storage capacitor C1 and the second storage capacitor C2 may be applied to the control electrode of the transistor TR1.

A first electrode of the third switch S3 may be electrically coupled with the first power supply VDD, and a third control signal CS-3 may be applied to a control electrode thereof. A first electrode of the fourth switch S4 may be electrically coupled with the control electrode of the transistor TR1 and the third node N3. The first control signal CS-1 may be applied to a control electrode of the fourth switch S4.

Based on a state of the fourth switch S4, the transistor TR1 may be in a diode-coupled state. Further, the fifth switch S5 may be electrically coupled between the second electrode of the transistor TR1 and the second power supply VSS. A second electrode may be electrically coupled with the second power supply VSS, and an inverse third control signal CSB-3 may be applied to a control electrode of the fifth switch S5.

The second storage capacitor C2 may be electrically coupled between the first storage capacitor C1 and the transistor TR1, and may compensate for a threshold voltage Vth of the transistor TR1. A first electrode of the second storage capacitor C2 may be electrically coupled with the second node N2, and a second electrode of the second storage capacitor C2 may be electrically coupled with the control electrode of the transistor TR1 and the third node N3.

In cases in which the transistor TR1 is, e.g., a low temperature polycrystalline silicon thin film transistor (LTPS-TFT) formed using an excimer laser annealing (ELA) method, the transistor TR1 may have non-uniform electrical characteristics, e.g., threshold voltage variation, as a result of energy deviation of the excimer laser. The second storage capacitor C2 may compensate for such threshold voltage variation.

The third storage capacitor C3 may be electrically coupled in parallel with each of the first storage capacitor C1 and the photodiode PD. The third storage capacitor C3 may increase a reverse bias potential of the photodiode PD when relatively very bright light is incident on the photodiode PD and the first storage capacitor C1 is rapidly discharged. That is, by applying a reverse bias potential, e.g., by applying a reverse bias potential of both the first storage capacitor C1 and the third storage capacitor C3 to the photodiode PD, overall discharge time may be extended. Thus, it is possible to accurately sense ambient light.

A first electrode of the third storage capacitor C3 may be electrically coupled with the first storage capacitor C1 through the sixth switch S6 and with the first power supply VDD through the seventh switch S7. A second electrode of the third storage capacitor C3 may be electrically coupled with the second power supply VSS. A first electrode of sixth switch S6 may be electrically coupled with the first electrode of the third storage capacitor C3, and a second electrode of the sixth switch S6 may be electrically coupled with the first electrode of the first storage capacitor C1. A fourth control signal CS-4 may be applied to a control electrode of the sixth switch S6. A first electrode of the seventh switch S7 may be electrically coupled with the first power supply VDD, and a second electrode of the seventh switch S7 may be electrically coupled with the second electrode of the third storage capacitor C3. An inverse fourth control signal CSB-4 may be applied to a control electrode of the seventh switch S7.

In embodiments of the present invention, the eighth switch S8 may be electrically coupled between the second node N2 and the first power supply VDD. A first electrode of the eighth switch S8 may be electrically coupled with the first power supply VDD, and a second electrode of the eighth switch S8 may be electrically coupled with the second node N2. The first control signal CS-1 may be applied to a control electrode of the eighth switch S8.

An output load 110 may be coupled between the first electrode of the transistor TR1 and the second electrode of the third switch S3, and the output load 110 may be electrically coupled with a fourth storage capacitor C4. The output load 110 may be, e.g., an internal load of an analog-digital converter. The fourth storage capacitor C4 may be a parasitic capacitor of a wire, but is not limited thereto.

In embodiments, one, some or all of the first through eighth switches S1, S2, S3, S4, S5, S6, S7, S8 may be, e.g., a transistor, or an equivalent thereof. More particularly, e.g., the transistor TR1 and the first, second, third, fourth, fifth, sixth, seventh and eighth switches S1, S2, S3, S4, S5, S6, S7 and S8 may be, e.g., a polycrystalline thin film transistor, an amorphous silicon thin film transistor, an organic thin film transistor, etc.

Further, if any of the transistor TR1 and the first through eighth switches S1, S2, S3, S4, S5, S6, S7, S8 are polycrystalline thin film transistors, they may be formed by, e.g., a laser crystallization method (method of crystallizing amorphous silicon by applying an excimer laser thereto), a metal induced crystallization method (method of initiating crystallization with a metal by positioning, e.g., the metal above amorphous silicon and applying a predetermined heat thereto), a high pressure annealing method (method of annealing polycrystalline silicon by applying a certain pressure thereto), and their equivalent methods that are low temperature crystallization methods, etc.

Further, the transistor TR1 and the first through eighth switches S1, S2, S3, S4, S5, S6, S7, S8 may be, e.g., a P-channel transistor, an N-channel transistor, etc., but are not limited thereto. In some embodiments, the transistor TR1 and the first through eighth switches S1, S2, S3, S4, S5, S6, S7, S8 may all be of a same type, e.g. P-type or N-type, or may be of different types, e.g., combination of P-type and N-type.

The first power supply VDD electrically coupled with the third switch S3, the first power supply VDD electrically coupled with the seventh switch S7, and the first power supply VDD electrically coupled with the eighth switch S8 may have the same voltage or different voltages. More particularly, a voltage of the first power supply VDD electrically coupled with the third switch S3 may be such that a voltage produced by subtracting a threshold voltage Vth from the first power supply VDD is higher than a voltage of the second power supply VSS coupled with the fifth switch S5 so that the transistor TR1 may operate. The second power supply VSS coupled with the photodiode PD, the first storage capacitor C1 and the third storage capacitor C3, and the second power supply VSS coupled with the fifth switch S5 may have the same voltage or can have different voltages. While the ambient light sensing circuit 101 is illustrated with specific components and a specific coupling scheme in FIG. 1A, embodiments of the invention are not limited thereto.

For example, referring now to the second exemplary embodiment of the ambient light sensing circuit 101, in some embodiments, the same components as those illustrated in FIG. 1A may be employed with a different coupling scheme. In general, only differences between the first exemplary ambient light sensing circuit 100 shown in FIG. 1A and the second exemplary ambient light sensing circuit 101 shown in FIG. 1B will be described below. More particularly, e.g., in the ambient light sensing circuit 101, a different coupling scheme for the first power supply VDD, the photodiode PD and the second power supply VSS may be employed relative to the coupling scheme of the exemplary ambient light sensing circuit 100 illustrated in FIG. 1A. That is, as shown in FIG. 1B, the first power supply VDD may be electrically coupled with a cathode of a photodiode PD' directly, and the second power supply VSS may be electrically coupled with a first electrode of an eighth switch S8' while a second electrode thereof may be electrically coupled with the second node N2. More particularly, e.g., an anode of the photodiode PD' may be electrically coupled to the first switch S1 directly, and may be coupled to the second power supply VSS via the first, second and eighth switches S1, S2, S8'.

Referring to FIGS. 1A and 1B, when a reverse current flows through the photodiode PD of the first exemplary ambient light sensing circuit 100, the first storage capacitor C1 is discharged, and when a reverse current flows through the photodiode PD' of the second exemplary ambient light sensing circuit 101, the second storage capacitor C2 is discharged. Accordingly, the higher a reverse current flowing through the photodiode PD in the exemplary ambient light sensing circuit 100 shown in FIG. 1A, the lower a coupling voltage produced by the first storage capacitor C1 and the second storage capacitor C2. However, the higher a reverse current flowing through the photodiode PD' in the exemplary ambient light sensing circuit 101 shown in FIG. 1B, the higher a coupling voltage produced by the first storage capacitor C1 and the second storage capacitor C2. For this purpose, in the exemplary ambient light sensing circuit 101 shown in FIG. 1B, a voltage of the first power supply VDD coupled with the photodiode PD' should be higher than a voltage of the second power supply VSS coupled with the eighth switch S8'.

Figure 2:
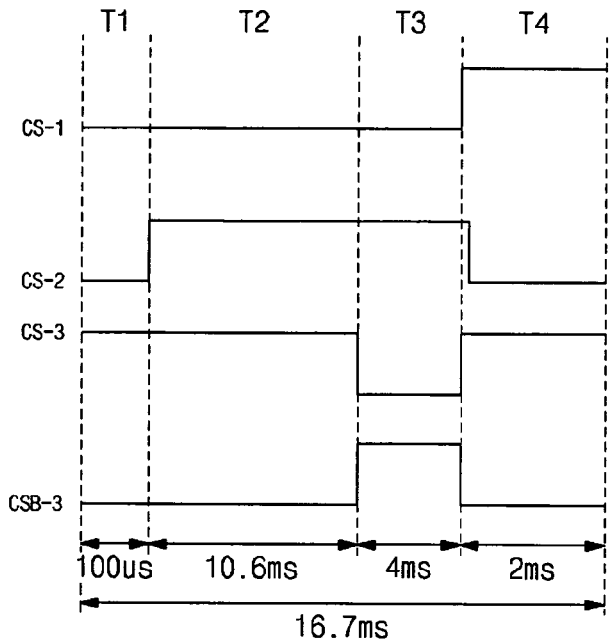
FIG. 2 illustrates an exemplary timing diagram of an ambient light sensing circuit according to aspects of the present invention.

FIG. 2 illustrates an exemplary timing diagram of an ambient light sensing circuit according to aspects of the present invention.

Referring to FIG. 2, the ambient light sensing circuit 100 may operate with a period of approximately 16.7 ms, i.e., a period of one frame when a flat panel display outputs one screen. Hence, in a flat panel display including the ambient light sensing circuit 100 shown in FIG. 1A, it is possible to automatically adjust screen brightness quickly in response to ambient brightness. Such an operation period of the ambient light sensing circuit 100 is merely an example and may be set to various operation periods.

Operation of the ambient light sensing circuit 100 may include, e.g., an initialization period T1, an ambient light sensing period T2, an ambient light sensing and compensating period T3, and a buffering period T4. The initialization period T1 may be, e.g., approximately 100 µs, the ambient light sensing period T2 may be, e.g., approximately 10.6 ms, the ambient light sensing and compensating period T3 may be, e.g., approximately 4 ms, and the buffering period T4 may be, e.g., approximately 2 ms. To perform an initialization process, an ambient light sensing process, an ambient light sensing and compensating process, and a buffering process during the respective periods T1, T2, T3, T4, the first control signal CS-1, the second control signal CS-2, the third control signal CS-3, and the inverse third control signal CSB-3 may be applied to the ambient light sensing circuit 100.

Referring to FIG. 2, the ambient light sensing circuit 100 may perform the ambient light sensing process during the period T2, i.e., the longest period. Thus, an ambient light sensing accuracy may be improved.

In some embodiments of the invention, the fourth control signal CS-4 (not shown in FIG. 2) and the inverse fourth control signal CSB-4 (not shown in FIG. 2) may be applied to the ambient light sensing circuit 100 when ambient light is relatively very bright. The fourth control signal CS-4 and the inverse fourth control signal CSB-4 will be described below.

Figure 4:
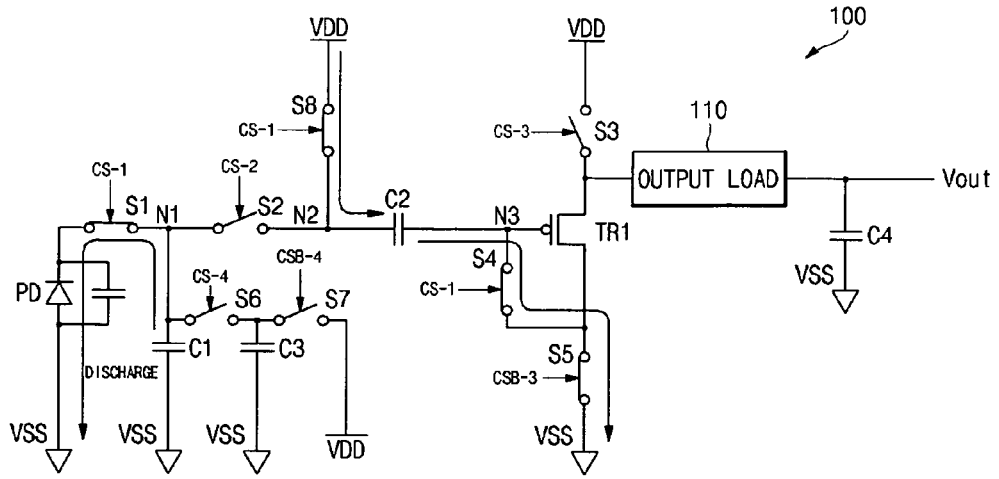
FIG. 4 illustrates a current path during an exemplary ambient light sensing period of the ambient light sensing circuit of FIG. 1A.
Figure 5:
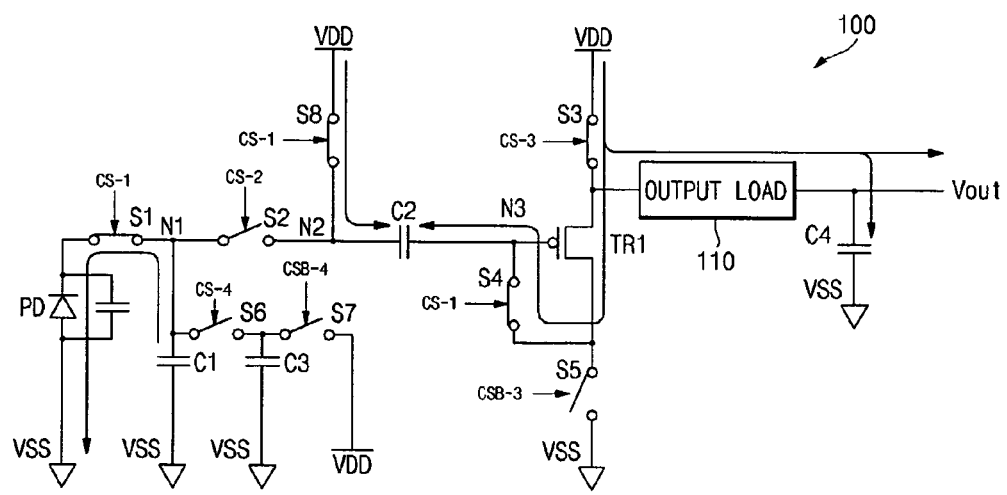
FIG. 5 illustrates a current path during an exemplary ambient light sensing and compensating period of the ambient light sensing circuit of FIG. 1A.
Figure 6:
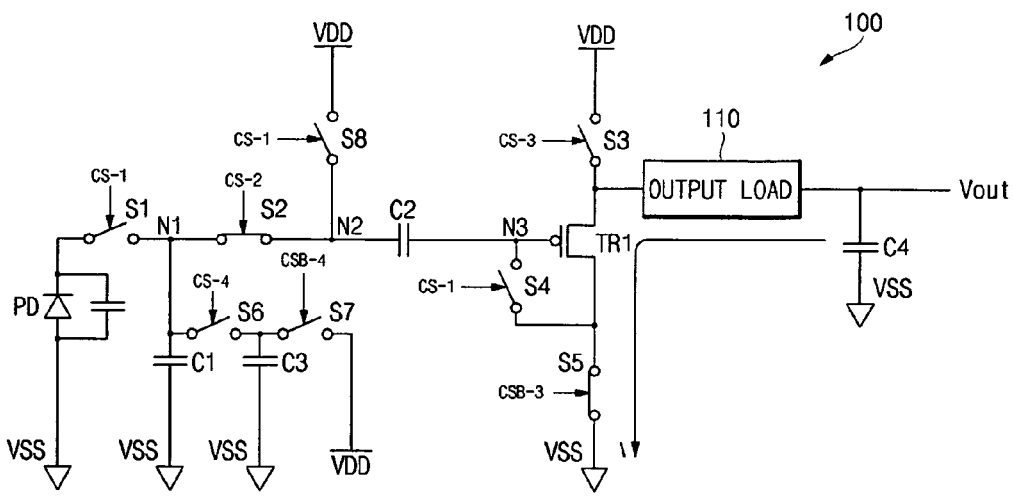
FIG. 6 illustrates a current path during an exemplary buffering period of the ambient light sensing circuit of FIG. 1A.

Operation of the exemplary ambient light sensing circuit 100 will be explained with reference to FIG. 1A, FIG. 2 and FIGS. 3 to 6. More particularly, FIG. 3 illustrates a current path during the initialization period T1 of the ambient light sensing circuit 100 of FIG. 1A, FIG. 4 illustrates a current path during the ambient light sensing period T2 of the ambient light sensing circuit 100 of FIG. 1A, FIG. 5 illustrates a current path during the ambient light sensing and compensating period T3 of the ambient light sensing circuit 100 of FIG. 1A, and FIG. 6 illustrates a current path during the buffering period T4 of the ambient light sensing circuit 100 of FIG. 1A.

In the exemplary embodiment of the ambient light sensing circuit 100 described below, it is assumed that all the switches S1 to S8 are P-channel transistors.

Figure 3:
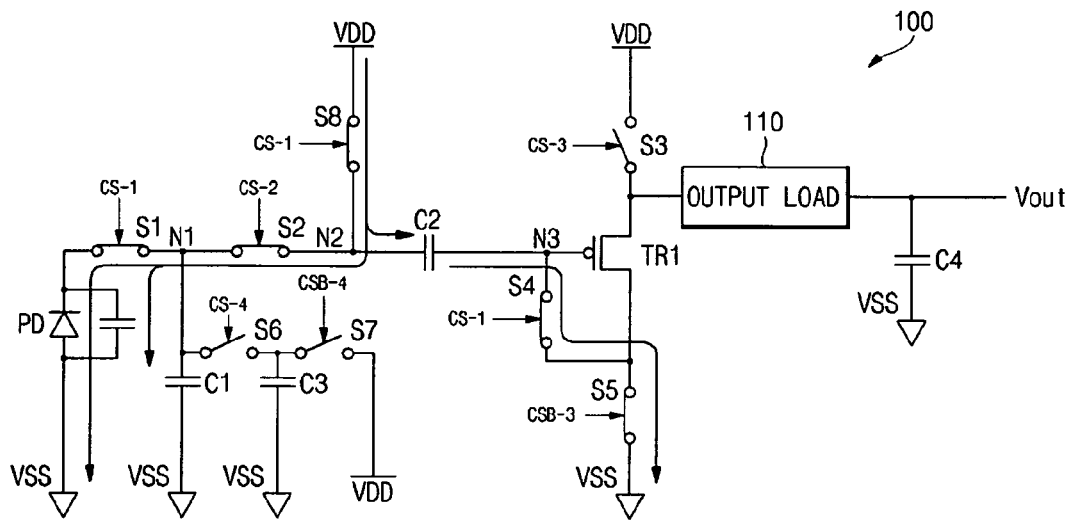
FIG. 3 illustrates a current path during an exemplary initialization period of the ambient light sensing circuit of FIG. 1A.

As shown in FIGS. 2 and 3, during the initialization period T1, the first control signal CS-1 at a low level may be applied to the control electrodes of the first switch S1, the fourth switch S4 and the eighth switch S8, respectively, the second control signal CS-2 at a low level may be applied to the control electrode of the second switch S2, the third control signal CS-3 at a high level may be applied to the control electrode of the third switch S3, and the inverse third control signal CSB-3 at a low level may be applied to the control electrode of the fifth switch S5. Accordingly, during the initialization period T1, the first switch S1, the second switch S2, the fourth switch S4, the fifth switch S5 and the eighth switch S8 may be switched on.

Thus, during the initialization period T1, a current path may be established from the first power supply VDD to the second power supply VSS through the eighth switch S8, the second switch S2, the first switch S1 and the photodiode PD. As a result, a predetermined current may flow through the photodiode PD. An amount of current flowing along the current path may generally increase in proportion to an amount of ambient light.

During the initialization period T1, another current path may be established from the first power supply VDD to the second power supply VSS through the eighth switch S8, the second switch S2 and the first storage capacitor C1. As a result, the first storage capacitor C1 may be initialized. That is, the first storage capacitor C1 may be charged with a voltage corresponding to a difference between the first power supply VDD and the second power supply VSS.

During the initialization period T1, yet another current path may be established from the first power supply VDD to the second power supply VSS through the eight switch S8, the second storage capacitor C2, the fourth switch S4 and the fifth switch S5. As a result, the second storage capacitor C2 may be initialized. That is, the second storage capacitor C2 may be charged with a voltage corresponding to a difference between the first power supply VDD and the second power supply VSS.

Next, referring to FIGS. 2 and 4, during the ambient light sensing period T2, the first control signal CS-1 at a low level may be applied to the control electrodes of the first switch S1, the fourth switch S4 and the eighth switch S8, respectively, the second control signal CS-2 at a high level may be applied to the control electrode of the second switch S2, the third control signal CS-3 at a high level may be applied to the control electrode of the third switch S3, and the inverse third control signal CSB-3 at a low level may be applied to the control electrode of the fifth switch S5. Accordingly, during the ambient light sensing period T2, the first switch S1, the fourth switch S4, the fifth switch S5 and the eighth switch S8 may be switched on.

Accordingly, during the ambient light sensing period T2, a current path may be established from the first storage capacitor C1 to the second power supply VSS through the first switch S1 and the photodiode PD. Thus, the first storage capacitor C1 may be discharged as a result of a predetermined current flowing through the first switch S1 and the photodiode PD. More particularly, based on characteristics of the photodiode PD, the first storage capacitor C1 may be rapidly discharged as a result of a relatively high current when ambient light is relatively bright, and the first storage capacitor C1 may be slowly discharged as a result of a relatively low current when ambient light is relatively dark.

During the ambient light sensing period T2, another current path may be established from the first power supply VDD to the second power supply through the eighth switch S8, the second storage capacitor C2, the fourth switch S4 and the fifth switch S5. As a result, the second storage capacitor C2 may maintain a state in which it is charged with a voltage corresponding to a difference between the first power supply VDD and the second power supply VSS, e.g., the voltage charged during the previous initialization period T1.

Next, as shown in FIGS. 2 and 5, during the ambient light sensing and compensating period T3, the first control signal CS-1 at a low level may be applied to the control electrodes of the first switch S1, the fourth switch S4 and the eighth switch S8, respectively, the second control signal CS-2 at a high level may be applied to the control electrode of the second switch S2, the third control signal CS-3 at a low level may be applied to the control electrode of the third switch S3, and the inverse third control signal CSB-3 at a high level may be applied to the control electrode of the fifth switch S5. Accordingly, during the ambient light sensing and compensating period T3, the first switch S1, the third switch S3, the fourth switch S4 and the eighth switch S8 may be switched on.

During the ambient light sensing and compensating period T3, a current path may be established from the first storage capacitor C1 to the second power supply VSS through the first switch S1 and the photodiode PD. As a result, the first storage capacitor C1 may be discharged by a predetermined current flowing through the first switch S1 and the photodiode PD.

During the ambient light sensing and compensating period T3, another current path may be established from the first power supply VDD to the output load 110 through the third switch S3. As is well known, the output load 110 may be coupled with the fourth storage capacitor C4, which may charged with a voltage supplied by the first power supply VDD.

During the ambient light sensing and compensating period T3, the transistor TR1 may be in a diode-coupled state when the fourth switch S4 is on. Therefore, a voltage corresponding to the first power supply VDD voltage less a threshold voltage Vth of the transistor TR1 may be applied to the third node N3. Further, a voltage of the first power supply VDD may be applied to the second storage capacitor C2 and, more particularly, to the second node N2 through the eighth switch S8. As a result, the threshold voltage Vth of the transistor TR1 may be stored in the second storage capacitor C2 beforehand. Thus, the threshold voltage Vth of the transistor TR1 may be offset during operation of the transistor TR1. That is, the transistor TR1 may always output a constant voltage without being affected by threshold voltage variation.

Next, as shown in FIGS. 2 and 6, during the buffering period T4, the first control signal CS-1 at a high level may be applied to the control electrodes of the first switch S1, the fourth switch S4 and the eighth switch S8, respectively, and the second control signal CS-2 at a low level may be applied to the control electrode of the second switch S2, the third control signal CS-3 at a high level may be applied to the control electrode of the third switch S3, and the inverse third control signal CSB-3 at a low level may be applied to the control electrode of the fifth switch S5. Accordingly, the second switch S2 and the fifth switch S5 may be switched on.

During the buffering period T4, a coupling voltage of the first storage capacitor C1 and the second storage capacitor C2 may be applied to the control electrode voltage of the transistor TR1. Therefore, a current corresponding to the coupling voltage of the first storage capacitor C1 and the second storage capacitor C2 may flow through the transistor TR1. That is, a current may flow from the fourth storage capacitor C4 to the second power supply VSS through the output load 110, the first and second electrodes of the transistor TR1 and the fifth switch S5. As a result, a voltage of the fourth storage capacitor C4 may be gradually lowered and may converge to a value corresponding to the coupling voltage of the first and second storage capacitors C1, C2 less a threshold voltage of the transistor TR1.

More particularly with regard to the coupling voltage of the first storage capacitor C1 and the second storage capacitor C2, in embodiments of the invention, a voltage of the first storage capacitor C1 may vary depending on an amount of ambient light that is incident on the photodiode PD. That is, if ambient light is relatively bright, then a relatively high current may flow through the photodiode PD, and thus, a relatively high current may be discharged by the first storage capacitor C1. As a result, a voltage of the first storage capacitor C1 may be relatively lowered. On the other hand, if ambient light is relatively dark, then a relatively low current may flow through the photodiode PD, and thus a relatively low current is discharged by the first storage capacitor C1. As a result, a voltage of the first storage capacitor C1 may maintain a relatively high state, i.e., relatively less is discharged.

Accordingly, a voltage, i.e., a coupling voltage of the first storage capacitor C1 and the second storage capacitor C2, applied to the control electrode of the transistor TR1 may vary depending on ambient light, and thus an amount of current flowing from the fourth storage capacitor C4 through the output load 110, the transistor TR1 and the fifth switch S5 to the second power supply VSS may also vary.

An analog-digital converter, e.g., may detect a voltage that remains in the fourth storage capacitor C4 afterwards, e.g., after the buffering period T4. Thus, such an analog-digital converter may obtain a voltage value related to ambient light, e.g., incident ambient light, as an analog value.

In embodiments, when an amount of ambient light incident through the photodiode PD is relatively smaller, then a current flowing through the photodiode PD may be relatively lower, and thus a coupling voltage of the first storage capacitor C1 and the second storage capacitor C may be relatively higher. Hence, a dischargeable voltage of the fourth storage capacitor C4 through the transistor TR1 may be relatively lower. Thus, a voltage that remains in the fourth storage capacitor C4 may be relatively higher. That is, an output voltage Vout may be higher.

When an amount of ambient light incident through the photodiode PD is relatively larger, a current flowing through the photodiode PD may be relatively higher, and thus a coupling voltage of the first storage capacitor C1 and the second storage capacitor C2 may be relatively lower. Hence, a discharge voltage of the fourth storage capacitor C4 through the transistor TR1 is relatively higher. Thus, a voltage that remains in the fourth storage capacitor C4 may be relatively lower. That is, an output voltage Vout may be relatively lower.

Hereinafter, operation of the third storage capacitor C3 by the fourth control signal CS-4 and the inverse fourth control signal CSB-4 will be described.

When a large amount of light is suddenly incident on the photodiode PD of the ambient light sensing circuit 100, a voltage charged in the first storage capacitor C1 may be rapidly discharged through the photodiode PD. That is, the first storage capacitor C1 may be discharged too rapidly. Thus, it may not be possible to secure a reliable output voltage from the transistor TR1 and to accurately sense the incident ambient light.

To reduce the occurrence of and/or prevent such a scenario, in embodiments of the invention, when an output voltage, e.g., a voltage applied to an analog-digital converter, that is output through an output terminal is continuously and/or repeatedly below a critical voltage for a predetermined time, as a feedback signal indicative of such a state, the inverse fourth control signal CSB-4 may be applied to the control electrode of the seventh switch S7 and the fourth control signal CS-4 may be applied to the control electrode of the sixth switch S6.

More particularly, when the inverse fourth control signal CSB-4 at a low level is supplied to the seventh switch S7, the first power supply VDD may be supplied to the third storage capacitor C3 and may carry out a charging operation. Then, the fourth control signal CS-4 at a low level may be supplied to the sixth switch S6 such that the third storage capacitor C3 may be coupled in parallel with each of the first storage capacitor C1 and the photodiode PD.

Hence, the first storage capacitor C1 and the third storage capacitor C3 may be coupled in parallel with the photodiode PD. Thus, a reverse bias potential thereof may be increased, i.e., current flow through the photodiode PD may be increased.

Accordingly, a current may flow through the photodiode PD for a sufficient time in order to sense ambient light. A voltage remaining in the first storage capacitor C1 and the third storage capacitor C3 may contribute to the operation of the transistor TR1.

Accordingly, in embodiments of the invention, the transistor TR1 may be reliably operated and an output voltage Vout may be stabilized. That is, ambient light may be sensed smoothly.

Figure 7:
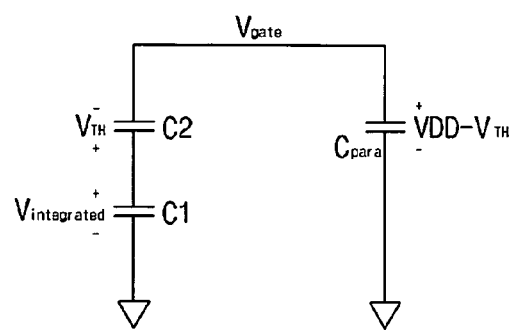
FIG. 7 illustrates an equivalent circuit diagram of storage capacitors employable for threshold voltage compensation and for analyzing error in an ambient light sensing circuit according to aspects of the present invention.

FIG. 7 illustrates an equivalent circuit diagram of storage capacitors employable for compensating for threshold voltage and for analyzing error in an ambient light sensing circuit according to aspects of the present invention.

More particularly, FIG. 7 illustrates an equivalent circuit diagram of the first storage capacitor C1, the second storage capacitor C2, and an equivalent parasitic storage capacitor Cpara of the transistor TR1 shown in FIG. 1A.

With reference to FIG. 7, a voltage (Vgate=Q/C) applied to the control electrode of the transistor TR1 may be calculated by the following equation.

$$V_{gate} = \frac{Q}{C}$$

$$= \frac{(V_{integrated} - V_{TH}) \cdot \frac{C_2 \cdot C_1}{C_2 + C_1} + (VDD - V_{TH}) \cdot C_{para}}{\frac{C_2 \cdot C_1}{C_2 + C_1} + C_{para}}$$

$$= \frac{V_{integrated} \cdot \frac{C_2 \cdot C_1}{C_2 + C_1} + VDD \cdot C_{para}}{\frac{C_2 \cdot C_1}{C_2 + C_1} + C_{para}} - V_{TH}$$

$$= F(V_{integrated}) - V_{TH}$$

Here, $V_{integrated}$ is a voltage of the first storage capacitor C1, $V_{th}$ is a voltage of the second storage capacitor C2, and $C_{para}$ is a capacitance of a parasitic storage capacitor of the transistor TR1.

As set forth in the above-mentioned equation, a voltage Vgate applied to the control electrode of the transistor TR1 is a value that corresponds to a value of a function related to a voltage of the first storage capacitor C1 less a threshold voltage stored in the second storage capacitor C2. Hence, in some embodiments of the invention, an output voltage of the ambient light sensing circuit 100 may be proportional to a voltage of the first storage capacitor C1, and a threshold voltage of the transistor TR1 may be compensated by the second storage capacitor C2.

Thus, in some embodiments of the invention, a voltage to which the fourth storage capacitor C4 converges by its discharge during the buffering process T4 may be relatively low when the control electrode voltage (Vgate=Q/C) of the transistor TR1 is relatively low, and may be relatively high when the control electrode voltage of the transistor is relatively high.

Further, in some embodiments of the invention, the control electrode voltage of the transistor being relatively low may correspond to a relatively large amount of light being incident on the photodiode such that a relatively high current flows. On the other hand, in some embodiments of the invention, the control electrode voltage of the transistor being relatively high may correspond to a relatively small amount of light being incident on the photodiode such that a relatively low current flows.

Figure 8:
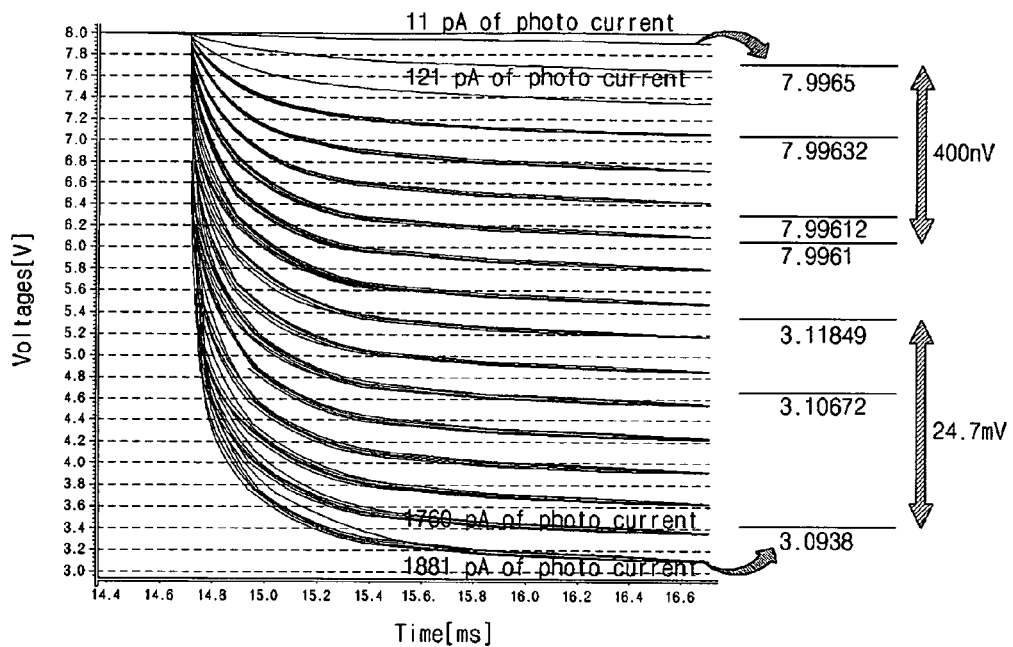
FIG. 8 illustrates a graph of relationship between output voltage variation and ambient light variation that may be observed using an ambient light sensing circuit according to an exemplary embodiment of the present invention.

FIG. 8 illustrates a graph of relationship between output voltage variation and ambient light variation that may be observed using an ambient light sensing circuit according to an exemplary embodiment of the present invention.

More particularly, FIG. 8 illustrates a graph of results obtained from a buffering process during the buffering period T4 of an exemplary embodiment of an ambient light sensing circuit. In FIG. 8, the x-axis corresponds to time (ms) and the y-axis corresponds to voltage (V).

As described above, during the buffering period T4, a coupling voltage applied to the control electrode of the transistor TR1 may vary depending on an amount of ambient light incident on the photodiode PD, and an analog voltage output through the output load 110 may also vary. For example, if an amount of ambient light incident through the photodiode PD is small, then a current flowing through the photodiode may be relatively low, and an output voltage may be relatively high. When an amount of ambient light incident through the photodiode PD is large, then a current flowing through the photodiode may be relatively high and an output voltage may be relatively low.

For example, referring to FIG. 8, in the exemplary embodiment of the invention shown therein, when a low current of approximately 11 pA flows through the photodiode PD, then an output voltage Vout may converge to a value between approximately 7.9961 V and 7.9965 V, and a deviation of the output voltage may be approximately 400 nV.

Furthermore, when a high current of approximately 1881 pA flows through the photodiode PD, then an output voltage Vout may converge to a value between approximately 3.0938 V and 3.11849 V, and a deviation of the output voltage may be approximately 24.7 mV.

It is known that a human typically recognizes ambient light in units of log scale. That is, in general, a human easily recognizes a slight variation of ambient light when the amount of ambient light is low, e.g., in a dark room, however, a human generally cannot recognize well a small variation in ambient light when an amount of ambient light is relatively large, e.g., under sunlight.

Accordingly, in some embodiments of the present invention, an output voltage Vout with a relatively small deviation may be output when the amount of ambient light is relatively small, while an output voltage Vout with a relatively large deviation may be output when the amount of ambient light is relatively large. That is, because human's are generally less sensitive to deviations in output voltage Vout, an ambient light sensing circuit may be more sensitive to changes in ambient light when the amount of ambient light is relatively low.

Figure 9:
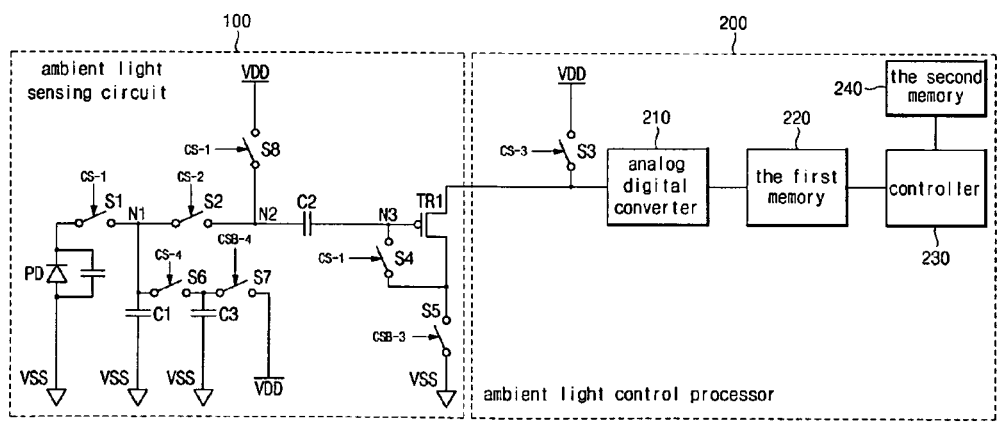
FIG. 9 illustrates a block diagram of a state in which an exemplary embodiment of an ambient light control processor is coupled with the ambient light sensing circuit of FIG. 1A according to aspects of the invention.

FIG. 9 illustrates a block diagram of a state in which an exemplary embodiment of an ambient light control processor is coupled with the ambient light sensing circuit of FIG. 1A according to aspects of the invention.

As shown in FIG. 9, according to the present invention, an ambient light control processor 200 may receive a signal from the ambient light sensing circuit 100. The ambient light control processor 200 may include an analog-digital converter 210, a first memory 220, a controller 230 and a second memory 240.

The analog-digital converter 210 may be electrically coupled to the first electrode of the transistor TR1. In some embodiments, the output load 110 and the fourth storage capacitor C4 may be embedded in the analog-digital converter 210. As described above, the output load 110 may be substantially an internal load of the analog-digital converter 210, and the fourth storage capacitor C4 may be substantially a storage capacitor of a wire. The analog-digital converter 210 may convert the output voltage Vout from an analog signal to a digital signal, and then output the output voltage Vout in digital form.

The first memory 220 may be electrically coupled with the analog-digital converter 210. The first memory 220 may temporarily store a digital value in accordance with a currently sensed ambient light condition.

The controller 230 may be electrically coupled with the first memory 220. The controller 230 may serve to calculate and output brightness of currently sensed ambient light.

The second memory 240 may be electrically coupled with the controller 230. The second memory 240 may store digital values previously obtained from ambient light of different brightness levels.

In some embodiments of the invention, sensed ambient light data input from the first memory 220 may be compared with ambient light data of different brightness levels stored in the second memory 240 in order to determine brightness of currently sensed ambient light corresponding to the sensed ambient light data input to the ambient light control processor 200.

Further, as shown in FIG. 9, in some embodiments of the invention, the third switch S3 may be included in the ambient light control processor 200, but embodiments are not limited thereto. For example, as shown in FIG. 1A, the third switch S3 may be included in the ambient light sensing circuit 100.

In some embodiments, the ambient light sensing circuit 100 may be formed on a substrate such as an organic light emitting display panel, whereas the ambient light control processor 200 may be separately formed in the form of one chip. However, embodiments of the invention are not limited thereto. For example, in some embodiments, the ambient light control processor 200 may be formed on a substrate such as an organic light emitting display panel. Further, e.g., the third switch S3 may be included in the ambient light control processor 200 provided in the form of one chip, or may be included in the ambient light sensing circuit 100 formed on a substrate.

Figure 10:
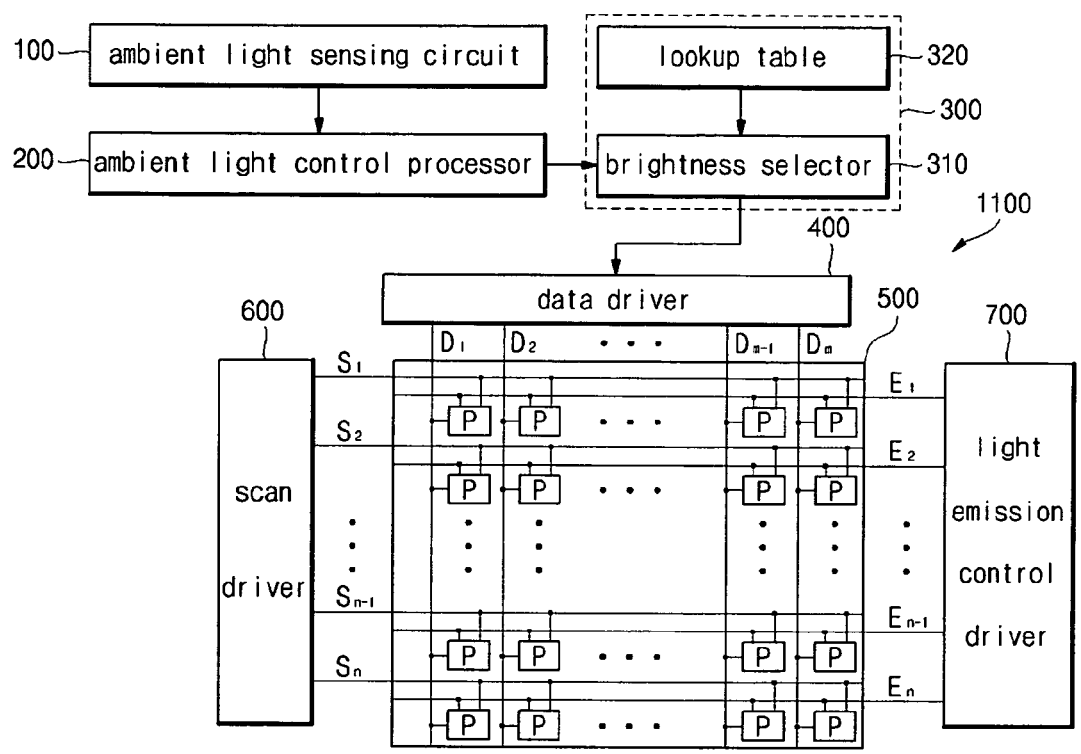
FIG. 10 illustrates a block diagram of an exemplary embodiment of a flat panel display including the ambient light sensing circuit of FIG. 1A according to aspects of the invention.

FIG. 10 illustrates a block diagram of an exemplary embodiment of a flat panel display 1100 including the ambient light sensing circuit of FIG. 1A according to aspects of the invention.

As shown in FIG. 10, the flat panel display 1100 employing aspects of the present invention may include a timing controller 300, a data driver 400, an organic light emitting display panel 500, a scan driver 600 and a light emission control driver 700, as well as the ambient light sensing circuit 100 described above and the ambient light control processor 200 described above. Although the flat panel display 1100 is shown including the ambient light sensing circuit 100, embodiments of the invention are not limited thereto and may employ other ambient light sensing circuits employing aspects of the invention, e.g., the ambient light sensing circuit 101 of FIG. 1B.

Further, in the organic light emitting display panel 500, a circuit part, e.g., pixel circuit, and an organic light emitting layer may form a pixel P. A plurality of such pixels P may be arranged in a matrix format and may display a stationary image or a dynamic image. The organic light emitting display panel 500 may include a plurality of data lines D1 to Dm extending from the data driver 400, a plurality of scan lines S1 to Sn extending from the scan driver 600, and a plurality of light emission control lines E1 to En extending from the light emission control driver 700. Each pixel P may be formed in an area where respective portions of the data lines D1 to Dm, the scan lines S1 to Sn, and the light emission control lines E1 to En intersect.

The timing controller 300 may include a brightness selector 310 and a lookup table 320. The brightness selector 310 may compare a digital value input from the ambient light control processor 200 with a value previously stored in the lookup table 320, and may output a data control signal corresponding to the input digital value to the data driver 400. More particularly, e.g., an optimum brightness control data signal that may be matched to a digital value input from the ambient light control processor 200 for red, green and blue data R, G, B may be previously stored in the lookup table 320.

Based on the data control signal supplied from the brightness selector 310, the data driver 400 may output a data signal corresponding to outside ambient light to the organic light emitting panel 500. For example, if the sensed ambient light is relatively bright, then a screen of relatively high brightness may be allowed to be displayed on the organic light emitting display panel 500 by outputting a data voltage |V| that outputs relatively bright light. Furthermore, if the sensed ambient light is relatively dark, then a screen of relatively low brightness may be allowed to be displayed on the organic light emitting display panel 500 by outputting a data voltage |V| that outputs relatively dark light.

Accordingly, embodiments of the invention may provide a display device that may automatically adjust screen brightness in accordance with the outside ambient light by, e.g., adjusting a magnitude of a data voltage |V| supplied to the respective data line Dm.

The scan driver 600 may supply a scan signal(s) to the organic light emitting display panel 500 so as to select respective pixel(s) P that is intended to be switched on and respective pixel(s) P that is intended to be switched off. The light emission control driver 700 may supply a respective light emission time signal that corresponds to switched-on time of each pixel P to the organic light emitting display panel 500. As the scan driver 600 and the light emission control driver 700 are well known to a person having ordinary skill in the art, detailed explanation thereof will be omitted.

In some embodiments of the invention, the ambient light sensing circuit 100, the ambient light control processor 200, the timing controller 300, the data driver 400, the organic light emitting display panel 500, the scan driver 600, and the light emission control driver 700 may all be formed on one common substrate through a semiconductor process and a thick film process. In some embodiments of the present invention, at least one of the ambient light sensing circuit 100, the ambient light control processor 200, the timing controller 300, the data driver 400, the organic light emitting display panel 500, the scan driver 600, and the light emission control driver 700 may be formed on a chip or a different substrate from a substrate on which the organic light emitting display panel 500 is formed. However, embodiments of the invention are not limited thereto.

Figure 11:
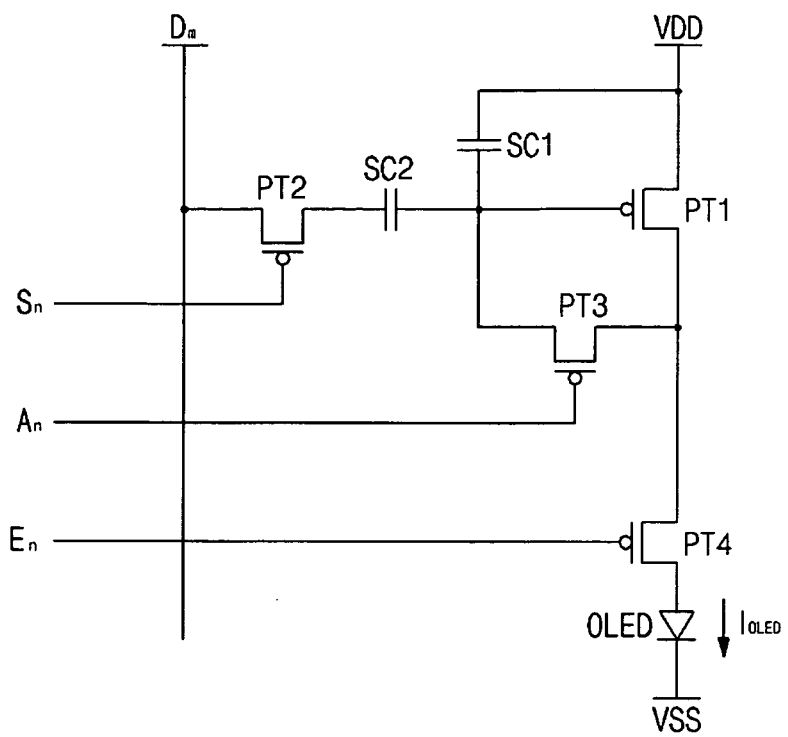
FIG. 11 illustrates a circuit diagram of an exemplary pixel circuit of an organic light emitting display panel.
Figure 12:
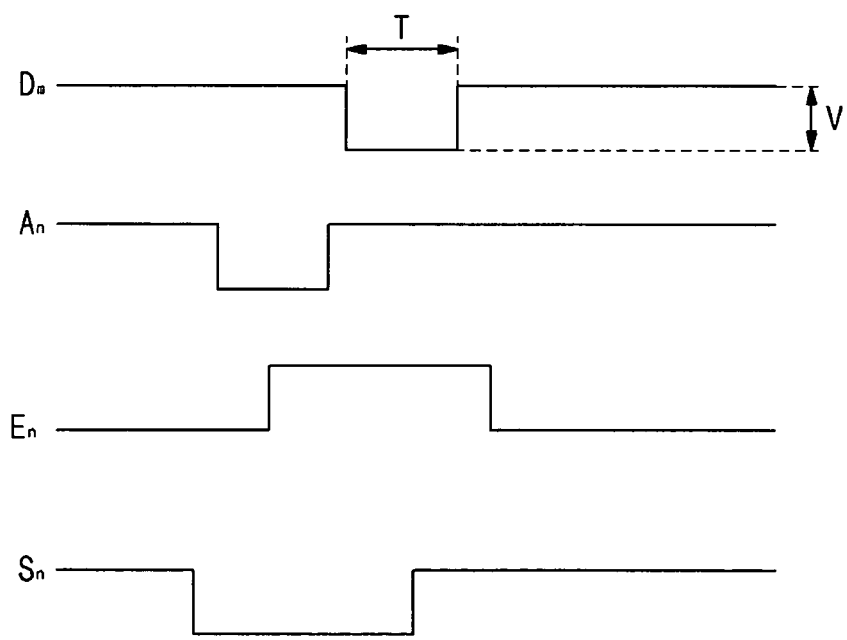
FIG. 12 illustrates an exemplary timing diagram of exemplary signals employable by the pixel circuit of FIG. 11 when employed in the exemplary flat panel display of FIG. 10.

FIG. 11 illustrates a circuit diagram of an exemplary pixel circuit 510 of an organic light emitting display panel. FIG. 12 illustrates a timing diagram of exemplary signals employable for driving the pixel circuit 510 of FIG. 11 when the pixel circuit 510 is employed in the flat panel display 1100 of FIG. 10.

As shown in FIG. 11, the pixel circuit 510 may include a scan line Sn for supplying a scan signal, a data line Dm for supplying a data voltage, a first power supply line for supplying the first power supply VDD voltage, a second power supply line for supplying the second power supply VSS voltage, an auto-zero line An for supplying an auto-zero signal, a light emission control line En for supplying a light emission control signal, a first transistor PT1, a second transistor PT2, a third transistor PT3, a fourth transistor PT4, a first storage capacitor SC1, a second storage capacitor SC2 and an organic light emitting diode OLED. A voltage of the first power supply line VDD may be relatively higher than a voltage of the second power supply line VSS.

A first electrode of the first transistor PT1 may be electrically coupled to the first power supply line and a first electrode of the first storage capacitor SC1, a second electrode of the first transistor PT1 may be electrically coupled to a first electrode of the third transistor PT3 and a first electrode of the fourth transistor PT4, and a control electrode of the first transistor PT1 may be electrically coupled to a first electrode of the second storage capacitor SC2 and a second electrode of the first storage capacitor SC1 and a second electrode of the third transistor PT3. A second electrode of the second storage capacitor SC2 may be electrically coupled to a first electrode of the second transistor PT2. A second electrode of the second transistor PT2 may be electrically coupled to the data line Dm. A control electrode of the second transistor PT2 may be electrically coupled to the scan line Sn. A control electrode of the third transistor PT3 may be electrically coupled to the auto-zero line An. A control electrode of the fourth transistor PT4 may be electrically coupled to the light emission control line En, and a second electrode of the fourth transistor PT4 may be electrically coupled to the organic light emitting diode OLED. In the exemplary embodiment of the pixel circuit 510 illustrated in FIG. 11, all of the transistors PT1, PT2, PT3 and PT4 are illustrated as P-type transistors, however, embodiments of the invention are not limited thereto.

Referring to FIGS. 11 and 12, in embodiments of the invention employing the pixel circuit 510, if an auto-zero signal at a low level is applied from the auto-zero line An to the control electrode of the third transistor PT3, the third transistor PT3 is turned on. Thus, the first transistor PT1 may be in a diode-coupled state, and a threshold voltage of the first transistor PT1 may be stored in the first storage capacitor SC1. Next, if a light emission signal at a high level is applied from the light emission control line En to the control electrode of the fourth transistor PT4, the fourth transistor PT4 is turned off. Next, the auto-zero signal may change to a high level and the third transistor PT3 may be turned off. Then, if a scan signal at a low level is applied from the scan line Sn to the control electrode of the second transistor PT2, the second transistor PT2 is turned on. When the second transistor PT2 is turned on, a data voltage at a low level may be applied from the data line Dm to the second storage capacitor SC2. Then, a data voltage corresponding to a threshold voltage of the first transistor PT1 and a coupling ratio of the first storage capacitor SC1 and the second storage capacitor SC2 may be applied to the control electrode of the first transistor TR1 (data recording operation).

Next, if a light emission signal at a low level is applied from the light emission control line En to the control electrode of the fourth transistor PT4, the fourth transistor PT4 is turned on. Thus, a predetermined current may flow from the first power supply line VDD to the organic light emitting diode OLED through the first transistor PT1 such that the organic light emitting diode OLED may emit light.

By employing the pixel circuit 510, a current flowing through the organic light emitting diode OLED may correspond to a data voltage supplied from the data line Dm irrespective of a threshold voltage of the first transistor PT1.

In embodiments of the invention, screen brightness may be automatically adjusted in accordance with ambient brightness, i.e., sensed ambient brightness. More specifically, in embodiments of the invention, a data voltage through the data line Dm of the pixel circuit 510 may be adjusted such that a coupling voltage of the first storage capacitor SC1 and the second storage capacitor SC2 may be adjusted and an amount of current supplied to the organic light emitting diode OLED $I_{OLED}$ through the first transistor PT1 may be controlled, i.e., may be varied based on sensed ambient brightness.

More particularly, referring to FIG. 12, the characteristic of the data voltage $D_M$ that may be adjusted in embodiments of the invention in relation to sensed ambient light is not time T, but a magnitude of voltage such that a data voltage stored in the first storage capacitor SC1 may vary, and an amount of current flowing through the organic light emitting diode OLED may vary. In embodiments of the invention, e.g., when ambient brightness is low, a data voltage |V| that generates relatively dark light may be supplied such that an amount of current flowing through the organic light emitting diode OLED may be reduced and a relatively dark screen may be displayed. Further, in embodiments of the invention, when ambient brightness is high, a data voltage |V| that generates relatively bright light may be supplied such that an amount of current flowing through the organic light emitting diode OLED may be increased and a relatively bright screen may be displayed.

Figure 13:
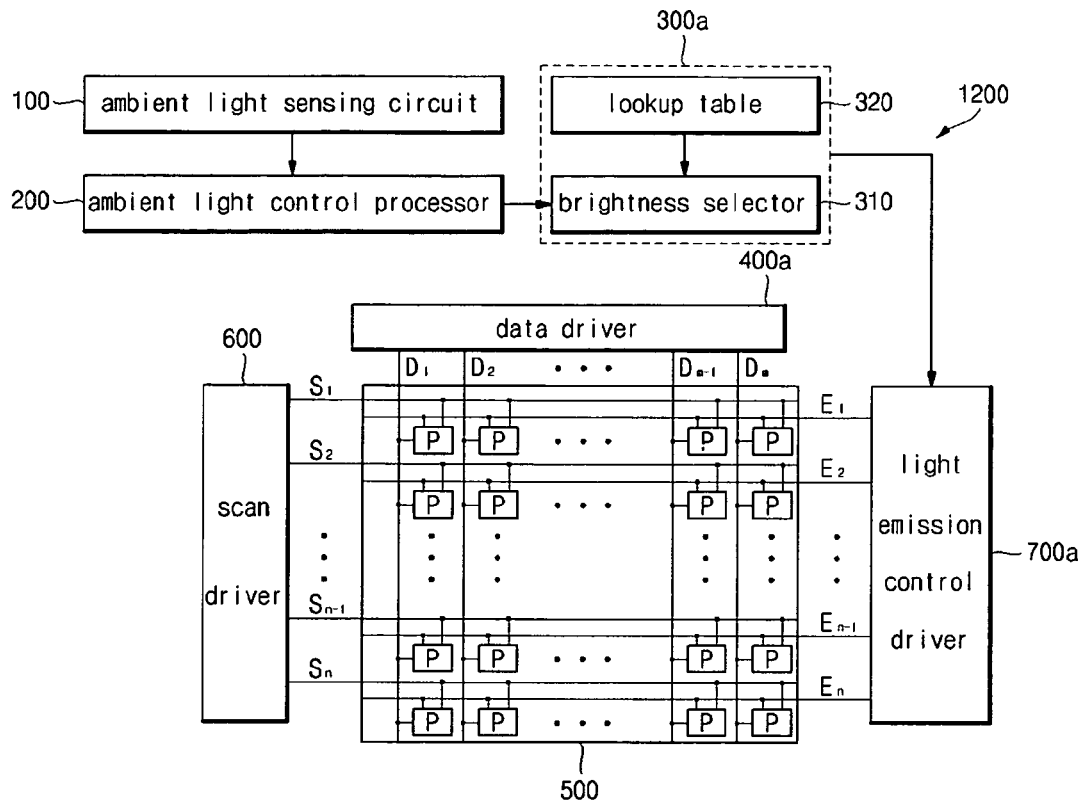
FIG. 13 illustrates a block diagram of another exemplary embodiment of a flat panel display including the ambient light sensing circuit of FIG. 1A according to aspects the invention.

FIG. 13 illustrates a block diagram of another exemplary embodiment of a flat panel display 1200 including the ambient light sensing circuit 100 of FIG. 1A according to aspects the invention. In general, only differences between the flat panel display 1200 and the flat panel display 1100 will be described below.

As shown in FIG. 13, the flat panel display 1200 may include a timing controller 300a, a data driver 400a, the organic light emitting display panel 500, the scan driver 600, and a light emission control driver 700a, as well as the ambient light sensing circuit 100 and the ambient light control processor 200. Although the flat panel display 1200 is shown including the ambient light sensing circuit 100, embodiments of the invention are not limited thereto and may employ other ambient light sensing circuits employing aspects of the invention, e.g., the ambient light sensing circuit 101 of FIG. 1B.

The timing controller 300a may include the brightness selector 310 and the lookup table 320. The brightness selector 310 may compare a digital value input from the ambient light control processor 200 with a value previously stored in the lookup table 320, and may output a control signal corresponding to the input digital value to the light emission control driver 700a. More particularly, e.g., an optimum brightness control signal that may be matched to a digital value input from the ambient light control processor for red, green and blue data R, G, B may be previously stored in the lookup table 320.

Based on the control signal supplied from the timing controller 300a, the light emission control driver 700 may output a light emission control signal corresponding to outside ambient light to the organic light emitting panel 500. For example, if the sensed ambient light is relatively bright, then a screen of relatively high brightness may be displayed on the organic light emitting display panel 500 by outputting a light emission control signal that is on, e.g., at a low level, for a relatively long period of time. Further, if the sensed ambient light is relatively dark, then a screen of relatively low brightness may be displayed on the organic light emitting display panel 500 by outputting a light emission control signal that is on, e.g., at a low level, for a relatively short period of time.

Accordingly, some embodiments of the invention may provide a display device that automatically adjusts screen brightness in accordance with the outside ambient light by, e.g., adjusting a period of time which a respective light emission control signal is on, e.g., at a low level.

In some embodiments, the data driver 400a may supply a data voltage(s) to the organic light emitting display panel 500, and the scan driver 600 may supply a scan signal(s) to the organic light emitting display panel 500 to select a pixel(s) that is intended to be switched on and a pixel(s) that is intended to be switched off. As the data driver 400a and the scan driver 600 are well known to a person having ordinary skill in the art, detailed explanation about them will be omitted.

Figure 14:
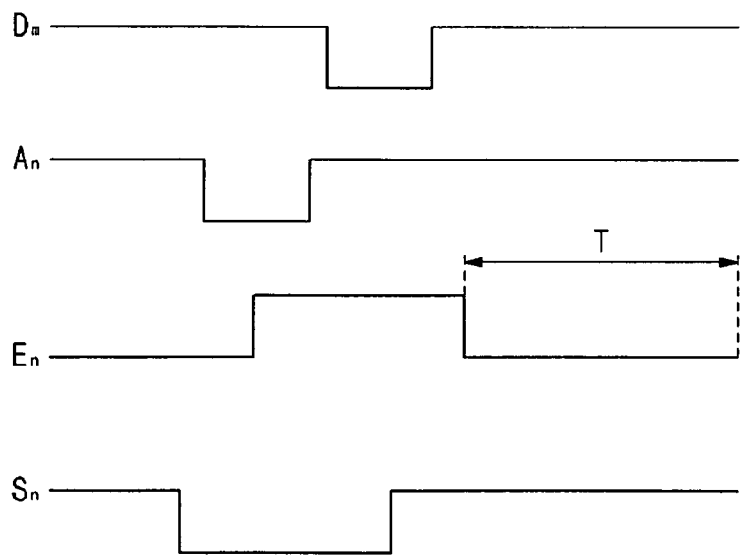
FIG. 14 illustrates another exemplary timing diagram of exemplary signals employable by the pixel circuit of FIG. 11 when employed in the exemplary flat panel display of FIG. 13.

FIG. 14 illustrates another exemplary timing diagram of exemplary signals for driving the pixel circuit 510 of FIG. 11 when the pixel circuit 510 is employed in the flat panel display 1200 of FIG. 13.

As described above, in some embodiments of the invention, screen brightness may be automatically adjusted in accordance with ambient brightness by, e.g., adjusting an "on-time" of a light emission control signal supplied through the light emission control line En of the respective pixel circuit 510 so as to adjust a light emission time of the corresponding organic light emitting diode OLED associated therewith.

More particularly, referring to FIG. 14, in some embodiments of the invention, a time T of a light emission control signal supplied to the respective light emission control line En of the pixel circuit 510 maybe adjusted so as to adjust a light emission time of the corresponding organic light emitting diode OLED associated therewith. For example, when ambient brightness, i.e., sensed ambient brightness, is low, a light emission time of the organic light emitting diode OLED may be relatively shortened by shortening a period of time T that the respective light emission control signal supplied to the light emission control line En of the pixel circuit 510 is on, i.e., at a low level, so that a relatively dark screen may be displayed. Further, when ambient brightness, i.e., sensed ambient brightness, is high, a light emission time of the organic light emitting diode OLED may be relatively lengthened by lengthening a period of time T that the respective light emission control signal supplied to the light emission control line En of the pixel circuit 500 is on, i.e., at a low level, so that a relatively bright screen may be displayed.

Figure 15:
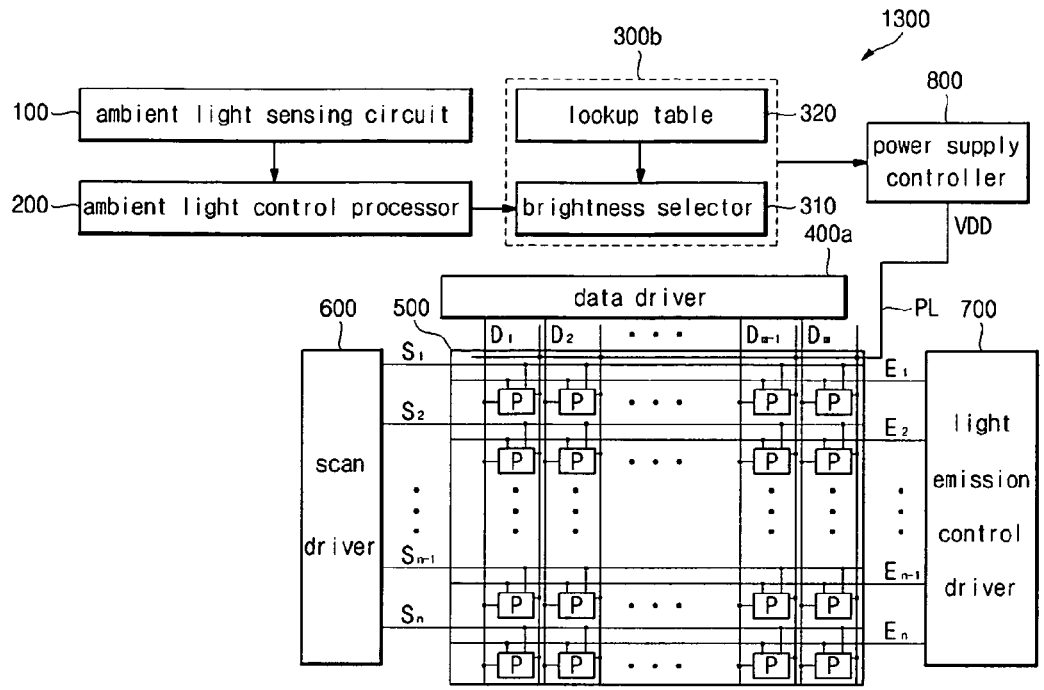
FIG. 15 illustrates a block diagram of another exemplary embodiment of a flat panel display including the ambient light sensing circuit of FIG. 1A according to aspects of the invention.

FIG. 15 illustrates a block diagram of another exemplary embodiment of a flat panel display 1300 including the ambient light sensing circuit of FIG. 1A according to aspects of the invention. In general, only differences between the flat panel display 1300 and the other exemplary flat panel displays 1100, 1200 will be described below.

Referring to FIG. 15, the flat panel display 1300 may include timing controller 300b, the data driver 400a, the organic light emitting display panel 500, the scan driver 600, the light emission control driver 700 and a power supply controller 800, as well as the ambient light sensing circuit 100 and the ambient light control processor 200.

Furthermore, in the organic light emitting display panel 500, a circuit part, e.g., pixel circuit, and an organic light emitting layer may form one pixel P, and a plurality of such pixels P may be arranged in a matrix format and may display a stationary image or a dynamic image. That is, the organic light emitting display panel 500 may include the plurality of data lines D1 to Dm extending from the data driver 400a, the plurality of scan lines S1 to Sn extending from the scan driver 600, the plurality of light emission control lines E1 to En extending from the light emission control driver 700, and a plurality of power supply lines PL extending from the power supply controller 800.

The timing controller 300b may include the brightness selector 310 and the lookup table 320. The brightness selector 310 may compare a digital value input from the ambient light control processor 200 with a value previously stored in the lookup table 320, and may output a control signal corresponding to the input digital value to the power supply controller 800. More particularly, e.g., an optimum control signal that may be matched to a digital value input from the ambient light control processor 200 for red, green and blue data R, G, B may be previously stored in the lookup table 320.

Based on the control signal supplied from the timing controller 300b, the power supply controller 800 may supply a power supply voltage corresponding to outside ambient light, i.e., sensed ambient light, to the organic light emitting display panel 500. For example, if the sensed ambient light is relatively bright, then a screen of relatively high brightness may be allowed to be displayed on the organic light emitting display panel 500 by supplying a high power supply voltage. Further, if the sensed ambient light is relatively dark, then a screen of relatively low brightness may be displayed on the organic light emitting display panel 500 by supplying a relatively low power supply voltage.

Accordingly, some embodiments of the invention may provide a display device that automatically adjusts screen brightness in accordance with the outside ambient light by, e.g., adjusting a power supply voltage supplied to the panel 500.

In such embodiments, the data driver 400a may supply a data voltage(s) to the organic light emitting display panel 500, and the scan driver 600 may supply a scan signal(s) to the organic light emitting display panel 500 to select a pixel(s) that is intended to be switched on and a pixel(s) that is intended to be switched off. Furthermore, the light emission control driver 700 may determine an actual switched-on time of a pixel by supplying a light emission control signal to the organic light emitting display panel 500. As the data driver 400a, the scan driver 600 and the light emission control driver 700 are well known to a person having ordinary skill in the art, detailed explanation about them will be omitted.

In embodiments, all of the ambient light sensing circuit 100, the ambient light control processor 200, the timing controller 300b, the data driver 400a, the organic light emitting display panel 500, the scan driver 600, the light emission control driver 700 and the power supply controller 800 may be formed on one common substrate through, e.g., a semiconductor process and a thick film process. However, embodiments of the invention are not limited thereto. For example, at least one of the ambient light sensing circuit 100, the ambient light control processor 200, the timing controller 300b, the data driver 400a, the scan driver 600, the light emission control driver 700, and the power supply controller 800 may be formed on a chip or a different substrate from a substrate on which the organic light emitting display panel 500 is formed.

Figure 16:
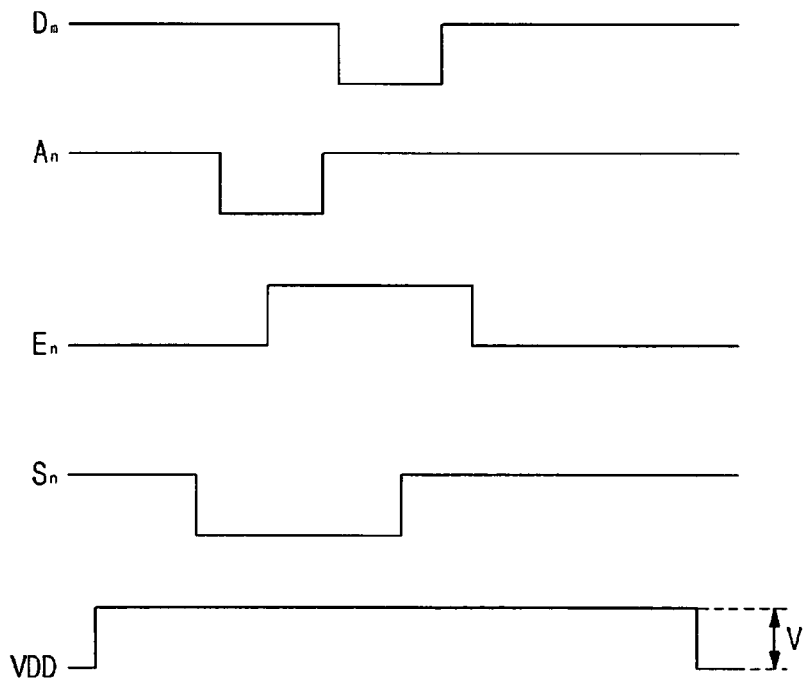
FIG. 16 illustrates another exemplary timing diagram of exemplary signals employable by the pixel circuit of FIG. 11 when employed in the exemplary flat panel display of FIG. 15.

FIG. 16 illustrates another exemplary timing diagram of exemplary signals for driving the pixel circuit 510 of FIG. 11 when the pixel circuit 510 is employed in the flat panel display 1300 of FIG. 15.

As described above, in some embodiments of the invention, screen brightness may be automatically adjusted based on ambient brightness, i.e., sensed ambient brightness by adjusting, e.g., a voltage of a power supply. More specifically, in some embodiments of the invention, brightness of a respective organic light emitting diode OLED(s) of the display panel 500 may be adjusted by adjusting a voltage of the first power supply VDD of the pixel circuit 510.

That is, referring to FIG. 16, a voltage (V) of the first power supply VDD may be adjusted so as to adjust brightness of the organic light emitting diode OLED. As a result, when ambient brightness is relatively low, brightness of the organic light emitting diode OLED may be relatively lowered by supplying a relatively low power supply voltage, and thus a relatively dark screen may be displayed. Further, when ambient brightness is relatively high, brightness of the organic light emitting diode OLED may be relatively increased by supplying a relatively high power supply voltage such that a relatively bright screen may be displayed.

Figure 17:
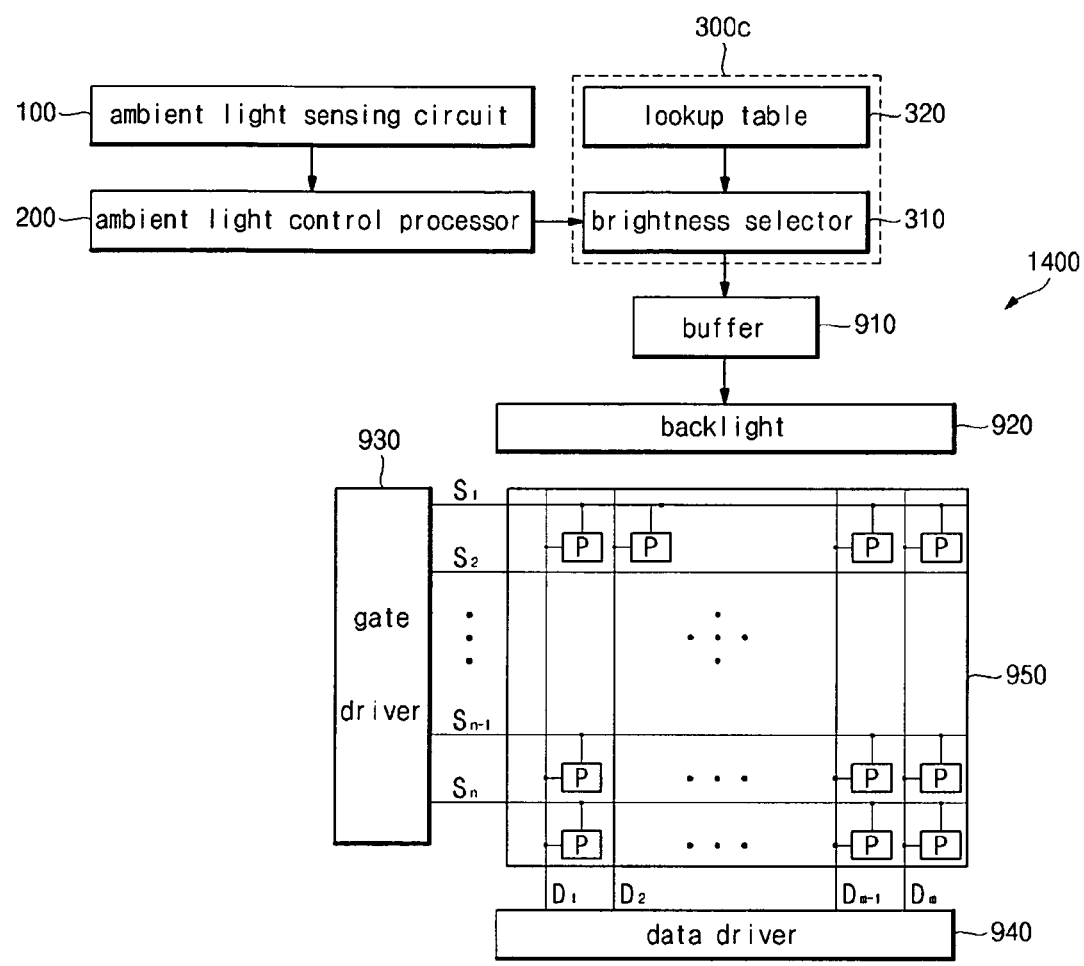
FIG. 17 illustrates a block diagram of another exemplary embodiment of a flat panel display including the ambient light sensing circuit of FIG. 1A according to aspects of the invention.

FIG. 17 illustrates a block diagram of another exemplary embodiment of a flat panel display 1400 including the ambient light sensing circuit of FIG. 1A according to aspects of the invention. In general, only differences between the flat panel display 1400 and the other exemplary flat panel displays 1100, 1200, 1300 will be described below.

As shown in FIG. 17, the flat panel display 1400 may include a timing controller 300c, a buffer 910, a backlight 920, a gate driver 930, a data driver 940, and a liquid crystal display panel 950, as well as the ambient light sensing circuit 100 and the ambient light control processor 200.

The timing controller 300c may include the brightness selector 310 and the lookup table 320. The brightness selector 310 may compare a digital value input from the ambient light control processor 200 with a value previously stored in the lookup table 320, and may output a control signal corresponding to the input digital value to the buffer 910. More particularly, e.g., an optimum brightness control signal that may be matched to a digital value input from the ambient light control processor 200 may be previously stored in the lookup table 320.

The buffer 910 may supply a boosted voltage corresponding to outside ambient light to the backlight 920. For example, if the sensed ambient light is relatively bright, then the buffer 910 may supply a relatively high boosted voltage to the backlight 920, and thus a screen of high brightness may be displayed on the liquid crystal display panel 950. Furthermore, if the sensed ambient light is relatively dark, then the buffer 910 may supply a relatively low boosted voltage to the backlight 920, and thus a screen of low brightness may be displayed on the liquid crystal display panel 950.

Accordingly, in some embodiments of the invention, a display device may automatically adjust screen brightness in accordance with sensed outside ambient light by controlling a voltage supplied to the backlight.

In the liquid crystal display panel 950, a circuit part and a color filter may form a pixel P. A plurality of such pixels may be arranged in a matrix format and may display a stationary image or a dynamic image. The circuit part and the color filter may serve as a kind of camera shutter. The backlight 920, which may be a high brightness light emitting diode or a cold cathode fluorescent lamp (CCFL), may be positioned on the rear side of the liquid crystal display panel 950. Thus, an image having a predetermined brightness may be displayed by light emitted from the backlight 920. Furthermore, the liquid crystal display panel 950 may be formed thereon with a plurality of scan lines S1 to Sn extending from the gate driver 930 and a plurality of data lines D1 to Dm extending from the data driver 940.

The gate driver 930 may supply a scan signal(s) to the liquid crystal display panel 950, and the data driver 940 may supply a data voltage(s) to the liquid crystal display panel 950. As the gate driver 930 and the data driver 940 are well known to a person having ordinary skill in the art, detailed explanation about them will be omitted.

In some embodiments of the invention, all of the ambient light sensing circuit 100, the ambient light control processor 200, the timing controller 300c, the buffer 910, the gate driver 930, the data driver 940 and the liquid crystal display panel 950 may be formed on one common substrate through a semiconductor process and a thick film process. However, embodiments of the invention are not limited thereto. For example, in some embodiments, at least one of the ambient light sensing circuit 100, the ambient light control processor 200, the timing controller 300c, the buffer 910, the gate driver 930, and the data driver 940 may be formed on a chip or a different substrate from a substrate on which the liquid crystal display panel 950 is formed.

Figure 18:
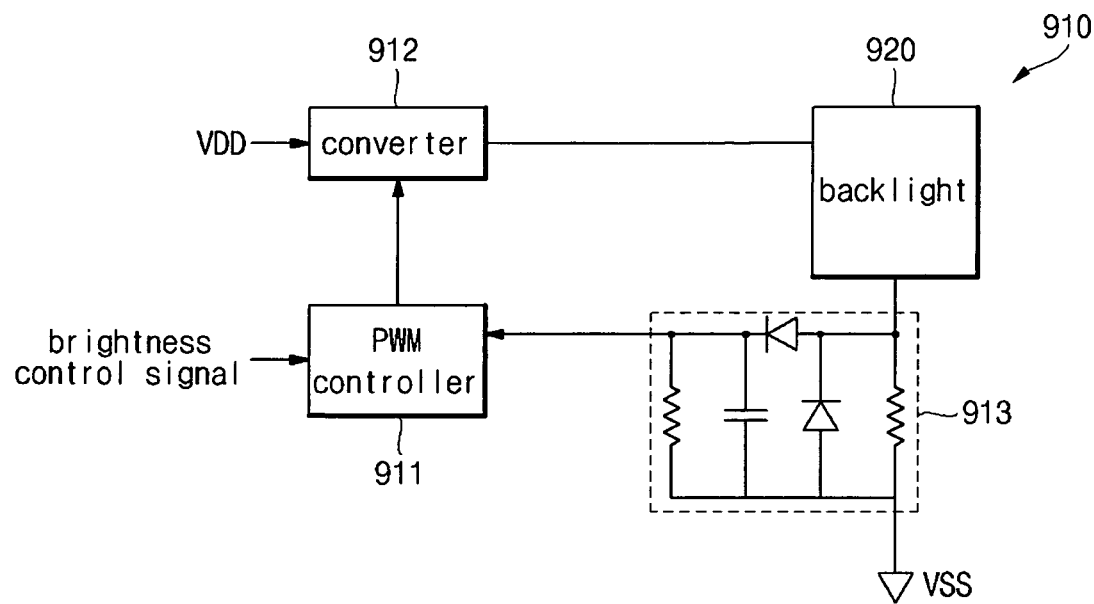
FIG. 18 illustrates a block diagram of an exemplary embodiment of the buffer employable by the flat panel display shown in FIG. 17.

FIG. 18 illustrates a block diagram of an exemplary embodiment of the buffer employable by the flat panel display shown in FIG. 17.

As shown in FIG. 17, the buffer 910 may include a PWM (pulse width modulation) controller 911, a converter 912, and a current detector 913. The PWM controller 911 may output a PWM control signal corresponding to a control signal. The control signal may be received from the timing controller 300c and may correspond to the sensed brightness. The converter 912 may receive the PWM control signal from the PWM controller 911 and may boost the power supply voltage VDD to a predetermined level based on the received PWM control signal. The current detector 913 may receive a current from the backlight 920 and may supply the received current to the PWM controller 911. Such a constitution of the buffer 910 is merely an example, and various constitutions of the buffer may be realized.

As described above, a control signal corresponding to sensed brightness may be input from the timing controller 300c to the PWM controller 911. Then, the PWM controller 911 may output a PWM control signal that matches the above-mentioned control signal to the converter 912. Accordingly, if the sensed ambient light is dark, then a PWM control signal that relatively lowers a boosted voltage may be output, or if the sensed ambient light is bright, then a PWM control signal that relatively increases a boosted voltage may be output.

Then, the converter 912 may receive the power supply voltage VDD, and may boost the received power supply voltage VDD to a predetermined voltage based on the PWM control signal before supplying it to the backlight 920. Accordingly, the backlight 920 may be lighted with a predetermined brightness. More particularly, brightness of the backlight 920 may be relatively lower when a boosted voltage is relatively low, and brightness of the backlight 920 may be relatively higher when the boosted voltage is relatively high.

In some embodiments, the current detector 913 may include resistor(s), diode(s), storage capacitor(s), etc., and may reduce a current received from the backlight 920 to a predetermined level before supplying the reduced current to the PWM controller 911. Hence, the PWM controller 911 may effectively control brightness of the backlight 920 based on the sensed ambient brightness.

Accordingly, in embodiments of the invention, when ambient light is dark, the backlight 920 may be lighted with a relatively low brightness such that screen brightness of the liquid crystal display panel 950 may be relatively reduced. Further, according to the present invention, when ambient light is bright, the backlight 920 may be lighted with a relatively high brightness such that screen brightness of the liquid crystal display panel 950 may be relatively increased. Thus, embodiments of the invention may provide a flat panel display in which screen brightness may be automatically adjusted based on sensed ambient light.

Ambient light sensing circuits and flat panel displays employing one or more aspects of the invention may output voltages of various levels based on sensed ambient light. For example, screen brightness of flat panel displays employing such an ambient light sensing circuit may be automatically adjusted using the respective corresponding output voltage such that visibility of the flat panel display may be improved regardless of whether it is positioned in a bright place or a dark place.

Flat panel displays including an ambient light sensing circuit according to one or more aspects of the invention may automatically adjust power consumption based on sensed ambient light, and optimum power consumption may be maintained such that a usable time, e.g., a battery life, of a portable flat panel display may be extended.

An ambient light sensing circuit according to embodiments of the invention may be formed on a same or a different substrate as that on which, e.g., an ambient light control processor, a timing controller, a data driver, a light emission control driver, a power supply controller, a buffer, a gate driver, and/or an organic light emitting display panel is/are formed.

In some embodiments of the invention, a flat panel display may include an ambient light sensing circuit, an ambient light control processor, a timing controller, a data driver and an organic light emitting display panel formed on a same substrate using, e.g., a low temperature polycrystalline silicon thin film transistor process such that a thickness of the flat panel display may be further reduced.

In some embodiments of the invention, a flat panel display may include an ambient light sensing circuit, an ambient light control processor, a timing controller, a light emission control driver, and an organic light emitting display panel formed on one substrate, e.g., using a low temperature polycrystalline silicon thin film transistor process, such that a thickness of the flat panel display may be further reduced.

In some embodiments of the invention, a flat panel display may include an ambient light sensing circuit, an ambient light control processor, a timing controller, a light emission control driver, a power supply controller, and an organic light emitting display panel formed on one substrate, e.g., using a low temperature polycrystalline silicon thin film transistor process, such that a thickness of the flat panel display may be further reduced.

In some embodiments of the invention, a flat panel display may include an ambient light sensing circuit, an ambient light control processor, a timing controller, a buffer, a gate driver, a data driver, and a liquid crystal display panel formed on one substrate, e.g., using a low temperature polycrystalline silicon thin film transistor process, such that a thickness of the flat panel display may be further reduced.

Exemplary embodiments of the invention are disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the invention as set forth in the following claims.

What is claimed is:

1. An ambient light sensing circuit, comprising:
   a photodiode that flows a current in proportion to ambient light;
   a first storage capacitor that is electrically coupled with the photodiode and is discharged after being charged with a voltage of a first power supply;
   a second storage capacitor that is electrically coupled with the first storage capacitor and provides a coupling voltage; and
   a transistor that outputs a current from the first power supply corresponding to the coupling voltage of the first storage capacitor and the second storage capacitor after being electrically coupled with the second storage capacitor, wherein
   a first electrode of the transistor is electrically coupled with a third switch that supplies the first power supply, the first electrode of the transistor being different from a control electrode of the transistor,
   a fourth switch is electrically coupled between a second electrode and the control electrode of the transistor,
   the second electrode of the transistor is electrically coupled with a fifth switch that supplies a second power supply, and
   an output terminal for outputting a current, the output terminal being between the first electrode of the transistor and the third switch.

2. The ambient light sensing circuit as claimed in claim 1, wherein the first storage capacitor is electrically coupled with a third storage capacitor that increases a reverse bias potential of the photodiode.

3. The ambient light sensing circuit as claimed in claim 1, wherein:
   the photodiode, the first storage capacitor and the second storage capacitor are initialized by being electrically coupled between the first power supply and the second power supply;
   the first storage capacitor is electrically coupled with the photodiode and is discharged in accordance with ambient light incident on the photodiode;
   the second storage capacitor and the transistor are electrically coupled between the first power supply such that the second storage capacitor stores a threshold voltage of the transistor; and
   the first storage capacitor and the second storage capacitor are electrically coupled with each other and the transistor outputs a current correspondingly to the coupling voltage of the first storage capacitor and the second storage capacitor.

4. The ambient light sensing circuit as claimed in claim 1, wherein the photodiode is one of a PIN diode, a PN diode and a photocoupler.

5. The ambient light sensing circuit as claimed in claim 1, wherein the photodiode is electrically coupled with a first switch that couples the photodiode with the first power supply and/or the first storage capacitor.

6. The ambient light sensing circuit as claimed in claim 1, wherein the first storage capacitor is electrically coupled with a second switch that electrically couples the first storage capacitor with the first power supply and/or the second storage capacitor.

7. The ambient light sensing circuit as claimed in claim 1, wherein when the fifth switch is turned on, a voltage charged in an output load coupled through the output terminal is discharged to the second power supply through the transistor and the fifth switch.

8. The ambient light sensing circuit as claimed in claim 2, wherein a first electrode of the third storage capacitor is electrically coupled with the first storage capacitor through a sixth switch and with the first power supply through a seventh switch, and a second electrode of the third storage capacitor is electrically coupled with the second power supply.

9. The ambient light sensing circuit as claimed in claim 1, wherein the first power supply is electrically coupled with an eighth switch for supplying the first power supply to the photodiode, the first storage capacitor and the second storage capacitor.

10. The ambient light sensing circuit as claimed in claim 1, wherein a first electrode of the transistor is electrically coupled with an ambient light control processor.

11. The ambient light sensing circuit as claimed in claim 10, wherein the ambient light control processor comprises:
    an analog-digital converter that is electrically coupled with the first electrode of the transistor;
    a first memory that is electrically coupled with the analog-digital converter and stores a digital value in accordance with present ambient light;
    a controller that is electrically coupled with the first memory and calculates and outputs brightness of the present ambient light; and
    a second memory that is electrically coupled with the controller and has predetermined digital values corresponding to ambient light of various brightness levels stored therein.

12. The ambient light sensing circuit as claimed in claim 11, wherein the analog-digital converter comprises:
- an output load that is electrically coupled with the first electrode of the transistor; and
- a fourth storage capacitor that is electrically coupled between the output load and the second power supply.

13. A flat panel display, comprising:
an ambient light sensing circuit including:
- a photodiode that flows a current in proportion to ambient light;
- a first storage capacitor that is electrically coupled with the photodiode and is discharged after being charged with a voltage of a first power supply;
- a second storage capacitor that is electrically coupled with the first storage capacitor and provides a coupling voltage; and
- a transistor that flows a current from the first power supply corresponding to the coupling voltage of the first storage capacitor and the second storage capacitor after being electrically coupled with the second storage capacitor, wherein
- a first electrode of the transistor is electrically coupled with a third switch that supplies the first power supply, the first electrode of the transistor being different from a control electrode of the transistor,
- a fourth switch is electrically coupled between a second electrode and the control electrode of the transistor,
- the second electrode of the transistor is electrically coupled with a fifth switch that supplies a second power supply, and
- an output terminal for outputting a current, the output terminal being between the first electrode of the transistor and the third switch;

an ambient light control processor that calculates present ambient light based on the current from the transistor and outputs a digital value corresponding to the present ambient light; and
a timing controller that outputs a control signal corresponding to the present ambient light based on the digital value output by the ambient light control processor.

14. The flat panel display as claimed in claim 13, wherein the timing controller comprises:
- a lookup table including predetermined digital values corresponding to ambient light of various brightness levels stored therein; and
- a brightness selector that compares the digital value output by the ambient light control processor with the predetermined digital values stored in the lookup table, selects a control signal corresponding to the present ambient light, and outputs the control signal corresponding to the present ambient light.

15. The flat panel display as claimed in claim 13, further comprising:
- a data driver that outputs a data signal corresponding to the present ambient light based on the control signal output by the timing controller; and
- an organic light emitting display panel that emits light based on the data signal output by the data driver.

16. The flat panel display as claimed in claim 15, wherein the data signal output by the data driver is a data voltage that is proportional to the present ambient light sensed by the ambient light sensing circuit.

17. The flat panel display as claimed in claim 13, further comprising:
- a light emission control driver that outputs a light emission control signal corresponding to the present ambient light based on the control signal output by the timing controller; and
- an organic light emitting display panel that emits light based on the light emission control signal output by the light emission control driver.

18. The flat panel display as claimed in claim 17, wherein the light emission control signal output by the light emission control driver controls an on-time of a light emission control signal supplied to the organic light emitting display panel, and the on-time of the light emission control signal is proportional to the present ambient light sensed by the ambient light sensing circuit.

19. The flat panel display as claimed in claim 13, further comprising:
- a power supply controller that outputs a power supply voltage corresponding to the present ambient light based on the control signal output by the timing controller; and
- an organic light emitting display panel that emits light based on the power supply voltage output by the power supply controller.

20. The flat panel display as claimed in claim 13, further comprising:
- a buffer that boosts and outputs a power supply voltage corresponding to the present ambient light based on the control signal output by the timing controller;
- a backlight that is lighted by a voltage supplied from the buffer; and
- a liquid crystal display panel that displays an image using light emitted from the backlight.

* * * * *